(12) United States Patent
Gentieu et al.

(10) Patent No.: US 7,231,558 B2
(45) Date of Patent: Jun. 12, 2007

(54) SYSTEM AND METHOD FOR NETWORK ERROR RATE TESTING

(75) Inventors: Paul Gentieu, Sunnyvale, CA (US);
Chris Cicchetti, Menlo Park, CA (US);
Arthur M. Lawson, Morgan Hill, CA (US); An Huynh, Alameda, CA (US);
Harold Yang, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 261 days.

(21) Appl. No.: 10/422,456

(22) Filed: Apr. 24, 2003

(65) Prior Publication Data

US 2006/0200708 A1    Sep. 7, 2006

Related U.S. Application Data

(63) Continuation-in-part of application No. 10/179,760, filed on Jun. 24, 2002, now Pat. No. 7,032,139.

(60) Provisional application No. 60/365,875, filed on Mar. 18, 2002.

(51) Int. Cl.
*H03M 13/47* (2006.01)

(52) U.S. Cl. .................... 714/704; 714/712; 714/715; 714/716

(58) Field of Classification Search ........ 714/715–716; H03M 13/47
See application file for complete search history.

(56) References Cited

U.S. PATENT DOCUMENTS

| | | | |
|---|---|---|---|
| 5,459,731 | A | 10/1995 | Brief et al. |
| 5,623,497 | A | 4/1997 | Shimawaki et al. |
| 6,069,876 | A | 5/2000 | Lander et al. |
| 6,268,808 | B1 | 7/2001 | Iryami et al. |
| 6,628,621 | B1 | 9/2003 | Appleton et al. |
| 2001/0033568 | A1 | 10/2001 | Spooner |
| 2002/0129307 | A1 | 9/2002 | Walker et al. |
| 2002/0149812 | A1 | 10/2002 | Hong et al. |
| 2002/0150334 | A1 | 10/2002 | Richardson et al. |
| 2002/0176139 | A1 | 11/2002 | Slaughter et al. |
| 2003/0005385 | A1 | 1/2003 | Stieger |

(Continued)

OTHER PUBLICATIONS

"GTX-B Bit Error Rate Tester, The Extended Physical Layer Verification System," Finisar Corporation, Sunnyvale, California, Jun. 2000, 4 pages.

(Continued)

*Primary Examiner*—R. Stephen Dildine
(74) *Attorney, Agent, or Firm*—Workman Nydegger

(57) ABSTRACT

An bit error rate tester for use in connection with a high speed networks. The bit error rate tester includes transmit and receive ports, as well as a sequence generator, memory, synchronizer, sequence start detect module, and comparator. The sequence generator generates a bit sequence for transmission through a network path. The bit sequence returns to the bit error rate tester by way of the receive port. The synchronizer then bit-aligns the received bit sequence to compensate for idles/fill words added/dropped as the bit sequence transited the network. The synchronized bit sequence is passed to the start word detector which detects start and end words in the bit sequence and instructs the comparator to compare only data between the start and end words. The comparator compares the received bit sequence with a copy of the transmitted bit sequence regenerated from the memory, and calculates a bit error rate.

67 Claims, 4 Drawing Sheets

U.S. PATENT DOCUMENTS

| | | |
|---|---|---|
| 2003/0026332 A1 | 2/2003 | Taunton |
| 2003/0065990 A1* | 4/2003 | Barford ...................... 714/704 |
| 2003/0097622 A1 | 5/2003 | Liu et al. |
| 2004/0107391 A1 | 6/2004 | Bauman |

OTHER PUBLICATIONS

"GTX-B Bit Error Rate Test System, Fibre Channel, Gigabit Ethernet, Gigabit-Rate Physical Layer Verification System," Finisar Corporation, Sunnyvale, California, Dec. 2000, 4 pages.

Ohtomo Y. et al., "A Single-Chip 3.5Gb/s CMOS/SIMOX Transceiver with Automatic-Gain-Control and Automatic-Power-Control Circuits," ISSCC 2000, Session 3, Gigabit-Rate Communications, Paper MP 3.5, 2000 IEEE International Solid-State Circuits Conference, Feb. 7, 2000, pp. 58-59.

The ATM Forum Technical Committee, 622 and 2488 Mbit/s Cell-Based Physical Layer, AF-PHY-0128.000, Jul. 1999.

* cited by examiner

SYSTEM AND METHOD FOR NETWORK ERROR RATE TESTING

RELATED APPLICATIONS

This application is a continuation-in-part of U.S. patent application Ser. No. 10/179,760, entitled "BIT ERROR RATE TESTER" and filed Jun. 24, 2002, now U.S. Pat. No. 7,032,139, which claims priority to U.S. Provisional Patent Application Ser. No. 60/365,875, entitled "BIT ERROR RATE TESTER" and filed Mar. 18, 2002, both of which are incorporated herein in their respective entireties by this reference.

BACKGROUND OF THE INVENTION

1. Field of the Invention

The present invention relates generally to error detection in high speed data transmission systems and components. More particularly, embodiments of the present invention concern error rate testing methods and devices suitable for use in connection with various network protocols and configurations.

2. Related Technology

Computer and data communications networks continue to proliferate due to declining costs, increasing performance of computer and networking equipment, and increasing demand for communication bandwidth. Communications networks—including wide area networks ("WANs") and local area networks ("LANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind many advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across Ethernet and SONET networks at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network typologies and protocols. Moreover, new network interconnection devices and software applications are constantly being introduced and implemented. Circumstances such as these highlight the need for effective, reliable and flexible diagnostic and remedial systems, methods and devices.

Consequently, as high speed data communications systems, processes and devices mature, many designs have increasingly focused on reliability and performance issues. One area of particular interest concerns the detection of errors, and determination of a corresponding error rate, for network systems and devices. Among other things, reliable and accurate error rate measurement during the development, manufacturing and installation of high speed networks and associated systems and devices is useful because it gives administrators and other personnel the capability to readily and precisely detect and correct problems, thereby helping to ensure the integrity of the data transmitted and processed by the network and associated devices.

To that end, various equipment, systems and methods have been developed that are used to determine an error rate along a particular data transmission path. In some instances, it is useful to determine the error rate on a bit and/or word basis. Thus, error rate testers and other systems and equipment have been developed that are employed to determine a bit error rate along a particular path on a network.

Generally, bit error rate testers operate by transmitting a predetermined bit sequence onto the network path, and then analyzing the predetermined bit sequence when it returns to the bit error rate tester. Typically, such analyses involve comparing the received bit sequence to a copy of the bit sequence that was initially transmitted onto the network. This comparison permits errors within the sequence to be identified and counted. After the errors in the bit sequence are counted, that information is used to calculate an overall bit error rate. Depending upon the particular value of the bit error rate, various remedial, or other, actions may then be implemented.

While such bit error testers have proven effective in some applications, they have nonetheless proven rather limited in terms of their ability to effectively adapt to the myriad of different, and evolving, network types and protocols. By way of example, conventional bit error rate testers are generally only effective when used in connection with network paths having certain configurations.

More particularly, many network devices drop or add idles or filler words to a data stream in order to maintain synchronization of the data within the stream. This situation is commonly encountered when a variety of network devices, each using a different clock, reside on a single network path. However, the bit sequence comparison procedures employed by typical bit error rate testers are not configured to compensate in any way for such idle or filler word modifications to the data stream. Consequently, once such a modification occurs, the received bit sequence becomes unsynchronized with the test bit sequence, invalidating the bit error rate test from that point forward.

Thus, network paths intended to be tested with known error rate testers generally must be clear of any networking device that could modify the data stream in which the transmitted test bit sequence was traveling. Restrictions such as these sharply constrain the usefulness of the testing device.

Advancements and changes in network protocols have likewise complicated network error testing and diagnostic processes. For example, the movement from the GE to 10 GE protocol has introduced some unique problems that have not been adequately resolved. One such problem relates to the manner whereby the physical layer encodes data for physical transmission on the network. In particular, developers had initially anticipated that the 8 B: 10 B code from Gigabit Ethernet could likewise be employed in connection with the 10 GE protocol. However, it is difficult to operate directly modulated lasers, such as are commonly employed in high speed networks, at the 12.5 Gbd data rate required to accommodate the 25% overhead of 8 B:10 B coding. Therefore, a more efficient coding method, known as 64/66 b, was devised. This reduces the coding overhead to approximately 3% and makes cost-effective 10 Gbit transceiver systems feasible. However, known test systems do not accommodate this coding method and are therefore unable to decode protocol data, which is necessary to compensate for modifications to the data stream since these occur at the protocol level.

In view of the foregoing, it would be useful to provide an error rate tester that is not constrained for use with particular network paths or configurations. Among other things, the error rate tester should be able to compensate for modifications to the data stream in which the transmitted test bit sequence travels. In this regard, it would be useful for the error rate tester to be able to identify when a bit sequence has become unsynchronized due to the insertion or deletion of a fill word, re-synchronize that bit sequence, and then perform an error rate test on the re-synchronized sequence. Furthermore, the error rate tester should support multiple protocols so as to enable effective and efficient testing, by a single tester, of networks conforming to a variety of different protocols, including networks with line speeds as high as 10 gigabits per second, or higher. Finally, the error rate tester should be capable of identifying and tracking errors at both the bit and word levels in the datastream.

BRIEF SUMMARY OF AN EXEMPLARY EMBODIMENT OF THE INVENTION

In general, embodiments of the invention generally relate to error detection in high speed data transmission systems and components. More particularly, embodiments of the present invention relate to error rate testing methods and devices suitable for use in connection with various network protocols and configurations.

In general, the error rate tester is used to test the integrity of paths within a network by transmitting a test bit sequence onto the path and then analyzing the sequence after it returns to the error rate tester. In one exemplary implementation, an error rate tester is provided that includes multiple network interfaces so that the error rate tester may be used in connection with a variety of different types of networks. In this implementation, a single error rate tester is configured to support multiple 10 Gigabit/second asynchronous protocols.

This exemplary error rate tester includes a sequence generator in communication with a memory device and a first communication port, as well as a detect module in communication with a second communication port. The detect module also communicates with a synchronization module that, in turn, communicates with a comparator whose output is directed to a statistics and counters module that tracks the number of bit and/or word errors that have occurred.

With respect to exemplary operational characteristics of this implementation of the error rate tester, a bit-by-bit analysis is performed by the error rate tester on a received test bit sequence in order to determine the number of bit and word errors in the sequence. The error rate tester is also able to determine whether a received bit sequence is synchronized, and if it is not, re-synchronize the bit sequence preparatory to determining the error rate.

More particularly, the sequence generator creates a test bit sequence that will be used for testing the error rate of a network path. The test bit sequence is generated using pre-stored data within the memory device, or may alternatively be generated according to a pre-defined polynomial, so that the bit sequence can be regenerated at a receiver side of the error rate tester. The created test bit sequence is transmitted onto a network path by way of the first communication port, and returned to the bit error rate tester by way of the second communication port. The synchronization module receives the test bit sequence from the network and ensures that the test bit sequence is bit-aligned. If necessary, the synchronization module compensates for any fill words added or dropped by the device, or devices, under test.

The synchronized bit sequence is then passed to the comparator which uses the received bit sequence to determine the bit error rate of the tested network path. More particularly, the received bit sequence is compared to the test bit sequence that was pre-stored in the memory prior to transmission onto the network. The comparator counts the number of errors within the received bit sequence and calculated the corresponding bit error rate.

The foregoing, and other, aspects of exemplary embodiments of the invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF SELECTED EMBODIMENTS OF THE INVENTION

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale. Moreover, while various headings are employed in the following discussion, such headings are included solely for the purpose of organizing and facilitating the disclosure hereof and are not intended, nor should they be construed, to define the invention or limit the scope of the invention in any way.

I. General Description of Aspects of An Exemplary Operational Setup

Figure 1:
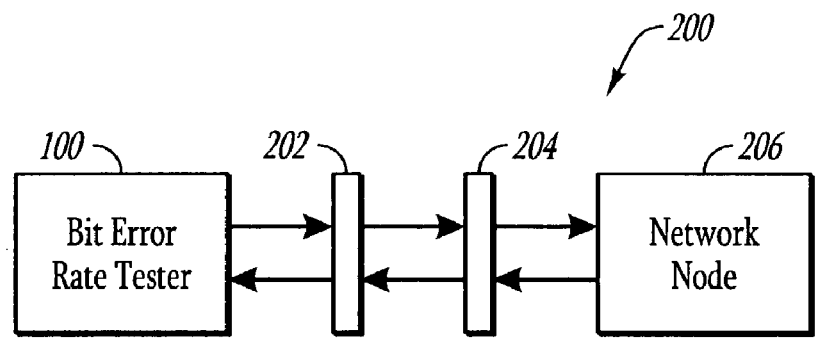
FIG. 1 is a block diagram that illustrates various high level aspects of an exemplary operational setup for an exemplary error rate tester.

With attention first to FIG. 1, details are provided concerning an exemplary operational setup wherein a bit error rate tester ("BERT"), designated generally at 100, is employed. Note that while the terms 'BERT' and 'bit error rate tester' are used herein in order to facilitate the discussion, the scope of the invention is not limited to systems, methods and devices that test only bit error rates but, as discussed elsewhere herein, contemplates systems, methods and devices for use in error rate testing at the bit and/or word level as well. Likewise 'error rate tester' includes systems, methods and devices for use in error rate testing at the bit and/or word level.

In the illustrated implementation, the BERT 100 is employed in connection with a network 200. The network 200 may comprise any network, and associated protocol, in connection with which the employment of embodiments of the BERT 100 may prove useful. For example, various embodiments of the BERT 100 are suited for use in connection with a variety of network 200 types and protocols including both synchronous and asynchronous network protocols, examples of which include, but are not limited to, Gigabit Ethernet ("GE"), 10 GE, Fiber Distributed Data Interface ("FDDI"), Fibre Channel ("FC") and 10 G Fibre Channel, Synchronous Optical Network ("SONET") and 10 G SONET, and ×4 InfiniBand, among others.

As discussed in further detail below, exemplary embodiments of the BERT 100 are configured so that compatibility with several network types and protocols is implemented within a single BERT 100. In one such exemplary implementation, a single BERT 100 is provided that is suited for use in testing 10 GE, SONET, and FC networks and devices. Of course, various other combinations of functionalities may likewise be employed. This functionality is useful in cases where, for example, metropolitan area networks ("MAN") employing multiple protocols must be tested.

In general, the exemplary network 200 in connection with which various embodiments of the BERT 100 may be employed includes first and second network devices 202 and 204. In some exemplary implementations, one or both of the network devices 202 and 204 comprise a repeater, regenerator, or other retiming device such as a Xenpak transceiver. More generally however, the first and second network devices 202 and 204 may comprise any network device in connection with which one or more implementations of the BERT 100 may be employed.

In addition to first and second network devices 202 and 204, the network 200 further includes one or more network nodes 206. In general, the network nodes 206 may comprise any device, or combination of devices, that can return a test bit sequence, discussed in further detail below, to the BERT 100. By way of example, the network node 206 may comprise components such as, but not limited to, a router, switch or bridging device.

In the exemplary arrangement indicated in FIG. 1, the BERT 100 is coupled into the network 200 so as to permit testing of various network devices and/or data paths defined by the network devices 202 and 204 and the network node 206. As described more fully below, the BERT 100 generates and transmits a test bit sequence that, in this exemplary case, travels through the first network device 202 and a second network device 204. When the test bit sequence is received back at the BERT 100, the test bit sequence is used by the BERT 100 to determine the number of errors that occurred on the indicated path.

Errors that corrupt or destroy certain portions of the sequence can occur for a variety of reasons. For example, optic signals typically experience some dispersion as they interact with optical fiber. Such dispersion degrades the signal, by lowering the signal-to-noise ratio, thereby causing errors in the signal ultimately received. As another example, various network devices on the path can also cause errors to occur within the bit sequence.

Aspects of such errors can be used to facilitate various diagnostic and remedial processes. For example, device failures or malfunctions on the network can be identified by examining the specific number of errors that have occurred on a particular path on the network, and the problematic network device(s) can be adjusted or replaced as required. Further, the number and occurrence of such errors can also be used to identify, locate and resolve problematic connections within the network 200.

II. General Structural Aspects of An Exemplary BERT Implementation

The following general discussion is directed to various structural aspects of an exemplary implementation of a BERT. Such discussion is not intended to limit the scope of the invention in any way however, and the physical, as well as operational, aspects of implementations of BERT that are disclosed herein are exemplary only and may be varied as necessary to suit the requirements of a particular application.

In general, the BERT 100 is a platform that is used to verify lower layers of links, independent of upper data communication protocols, at various line rates. Exemplary line rates supported by the BERT 100 include, but are not limited to, 9.95 Gigabit/second, 10.3 Gigabit/second, and 10.5 Gigabit/second. Further, the BERT 100 is also configured to support pattern specification in a variety of upper layer serial protocols for network BERT 100 testing.

With regard to aspects of its physical configuration, this exemplary implementation of the BERT 100 is configured as an externally powered stand-alone device that employs a 300 pin MSA connector that allows the BERT 100 to function as a modular site to connect to various types of optical and/or electrical transceivers/transponders. Exemplarily, the BERT 100 is controlled by software running at a host under Windows 2000 or Windows NT 4.X and includes an Ethernet, R232 serial, or Universal Serial Bus ("USB") interface to the host. The host interface of the BERT 100 may alternatively comprise a parallel port.

Further physical aspects of this exemplary implementation of the BERT 100 relate to the media in connection with which the BERT 100 may be employed. For example, the BERT 100 includes a modular media area that enables the use of daughter cards containing different logic-to-network media types. Among other things, this aspect of the BERT 100 permits the BERT 100 to be used in connection with a variety of media types, thus enhancing the operational flexibility of the BERT 100. The BERT 100 also includes a secondary connector for use in carrying control signals to logic present on one or more of the daughter boards. In at least some implementations, this secondary connector enables the reporting of the nature and type of the attached media.

Figure 2:
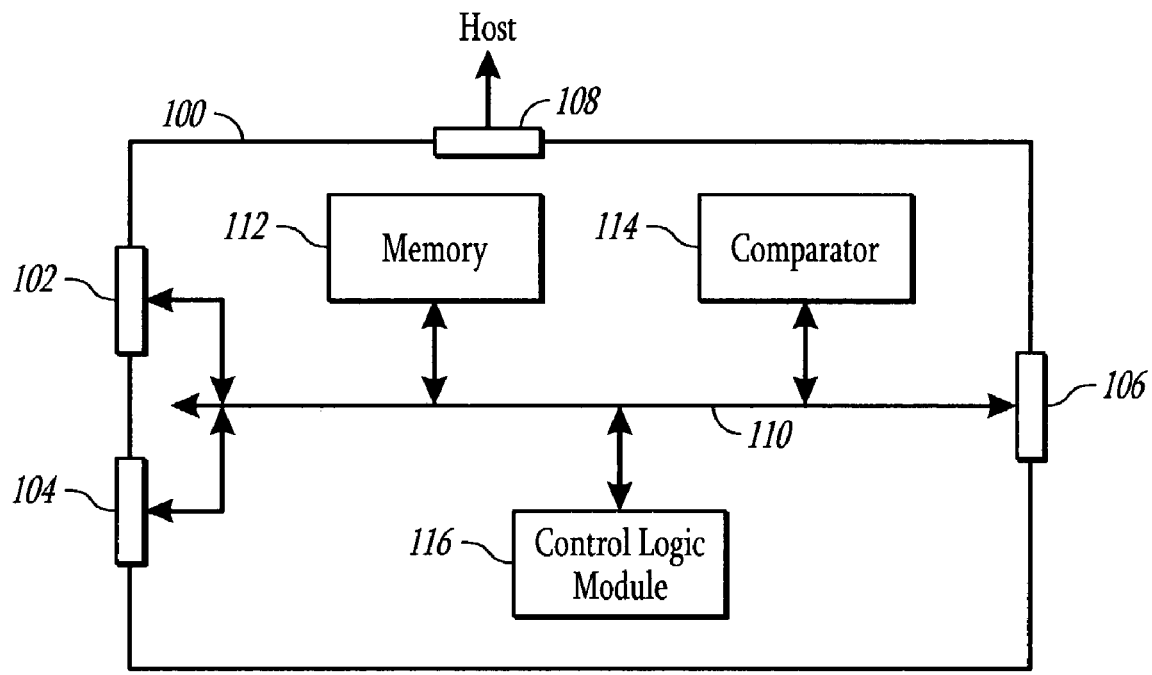
FIG. 2 is a block diagram that illustrates various high level aspects of an exemplary implementation of an error rate tester.

Directing particular attention now to FIG. 2, a block diagram is illustrated that provides basic information concerning various connections and data paths within an exemplary BERT 100 implementation. As suggested there, embodiments of the BERT 100 may include multiple interfaces, or ports, such as ports 102, 104, 106 and 108, through which data may be transmitted and/or received. Such ports may be optical or electrical or, the BERT 100 may employ a combination of optical and electrical ports.

Further, the ports 102, 104, 106 and 108 may assume any of a variety of different configurations, depending upon factors such as, but not limited to, the intended function(s) of the port. In one exemplary implementation of BERT 100, port 102 comprises a 300 pin XBI interface, while the port 104 comprises, for example, a direct serial port, an electrical serial interface, or a 10 Gigabit Small Form Factor Pluggable ("XFP") optical or electrical port. Further, the port 106 comprises, in some exemplary implementations of BERT 100, a XENPAK port, or a 10 GE interface.

Finally, at least some implementations of BERT 100 provide for a port 108 that serves as a host connection that allows the BERT 100 to be controlled by a host device. For example, a host device running an operating system, such as the Windows® 2000™ operating system (Windows and Windows 2000 are trademarks of Microsoft Corporation of Redmond, Wash.), may be used to control the operation of the BERT 100 and/or to analyze data provided by the BERT 100. The port 108 may be configured as, for example, Ethernet, serial RS232, Universal Serial Bus ("USB"), or as a parallel port.

It should be noted that the types and combination of interfaces described in connection with the exemplary embodiment of BERT 100 illustrated in FIG. 2, as well as the associated protocols, are exemplary only and are not intended to limit the scope of the invention in any way. More generally, any additional or alternative type and/or combination of ports, conforming to any of a variety of protocols, may be employed as necessary to suit the requirements of a particular application.

Among other things, the multiple ports 102, 104, 106 and 108, and/or other interfaces, lend significant flexibility to implementations of the BERT 100 in that they permit the BERT 100 to operate in a multiple mode configuration. For example, some implementations of the BERT 100 are configured with a combination of ports that enable the BERT 100 to operate in a dual mode, such as an optical/electrical mode. In one such exemplary implementation, operations of the BERT 100 include transmitting a test bit sequence from a fiber optic port, such as a mixed block input output ("XBI") port for example, and receiving the return test bit sequence on an electrical port such as, for example, a direct SubMiniature version A ("SMA") port. Thus, embodiments of the BERT 100 are configured to be readily employed in a variety of different types of networks, and can be placed in any number and type of different data paths within a given network.

Various other types of operational flexibility are likewise afforded by interfaces such as the exemplary ports 102, 104, 106 and 108. By way of example, an XBI interface and direct serial port, such as an SMA port, allow traffic transmitted by the BERT 100 to be looped through a cable, either with or without attenuation, in order to enable testing, at the ports 102 and 104, respectively, of the 'transmit' (TX) and 'receive' (RX) side integrities of the XBI module, optical fiber, or other physical layer device.

Further, where port 106 is implemented for use in connection with a XENPAK module, port 106 enables traffic to be transmitted by the BERT 100 to a XENPAK module through an X Ethernet Attachment Unit Interface ("XAUI") interface and then looped to the serial interface of the XENPAK module in order to test the integrity of the XENPAK module, or the integrity of any other device attached to the XENPAK module. With respect to the foregoing, the XAUI port exemplarily defines a narrow, fast GE data pipe that is implemented with integrated circuitry such as complementary metal oxide semiconductor ("CMOS") integrated circuits, or embedded application specific integrated circuits ("ASIC").

In addition to the general operational flexibility that they afford, interfaces such as exemplary ports 102, 104, 106 and 108 also enable a relatively high level of flexibility in terms of the creation and detection of the sequence bits that comprise the test bit sequences employed by embodiments of the BERT 100. For example, the test bit stream created by the BERT 100 and transmitted from the XBI and direct serial ports may comprise, among other things, a user-defined bit sequence or a pseudo-random bit sequence ("PRBS"). In similar fashion, the bit stream created by the BERT 100 and transmitted from an XAUI port exemplarily comprises 10 GE traffic, which may include user-defined patterns of idles, frames and words.

As briefly described above, and as further suggested in FIG. 2, the ports 102, 104, 106 and 108 are configured and arranged to interact with various components within the BERT 100 so as to enable implementation of various functionalities. Exemplarily, a bus 110 connects each of the ports 102, 104, 106 and 108 and allows data to travel between and among the various components of the BERT 100.

In the illustrated implementation, the BERT 100 further includes a memory device 112, a comparator 114, and control logic module 116, all of which are connected by way of the bus 110. Exemplarily, the memory device 112 includes two internal RAMs, a 'Send' RAM and a 'Compare' RAM that, respectively, define the test bit sequence that will be sent, and the bit sequence that will be compared to the received bit sequence. Further details concerning aspects of the structure and operation of exemplary implementations of the memory device 112 are provided below.

The comparator 114 of the BERT 100 comprises digital logic that enables comparison of the received test bit sequence to a copy of the test bit sequence that was transmitted initially from the BERT 100. In general, the comparator 114 identifies errors within the received bit sequence and calculates a bit error rate.

The control logic module 116 is coupled to the ports 102, 104, 106 and 108, by way of bus 110, and generally serves to control activities at those ports, and also implements various control functionalities concerning other components within the BERT 100. The functionality represented by control logic 116 may be implemented with any suitable digital circuitry. In at least some implementations, the control logic 116 is configured to be modified to accommodate the requirements of a particular application. By way of example, some implementations of the control logic 116 include suitable field programmable gate arrays ("FPGA") that enable the circuit logic to be readily upgraded to accommodate changes to operational parameters, examples of which include protocol modifications and line rate changes.

III. Specifications for An Exemplary BERT Implementation

In relation to the foregoing general discussion concerning various structural aspects of an exemplary BERT implementation, detailed specifications are now provided concerning an exemplary BERT implementation. In particular, aspects of the functionality of the BERT, as disclosed herein, are exemplarily implemented by a BERT substantially conforming with the following specifications:

transmitter fixed rates (10.3125 Gbps/10.51875 Gbps; user-defined based on supplied reference clock; frequency is ±100 PPM); link connections (duplex XBI module with 1310 nm SC single mode option);

trigger in/out (SMA connector—input to start data generation or stop compare; output to pulse on bit error or per loop sent);

clock/64 In (SMA connectors—50 ohms, 1 Vpp AC coupled differential low voltage positive/pseudo emitter coupled logic ("LVPECL"), 155–170 MHz);

clock 64/Out (SMA connectors—50 ohms, 1 Vpp AC coupled differential LVPECL);

operating modes ('send' and 'compare' for BERT; 'send only' for PLL recovery and error testing; 'compare only' if two Xgig BERTs are attached at either end of long link; latency test; error injection);

patterns (send raw PRBS data $2^{31}$, $2^{23}$, $2^{15}$, $2^7$; 128K bits per pattern; specify patterns as raw 64-bits, raw 66-bits, or 32+4 XGMII words; patterns include predefined frame from frame library, customized frame, or frame with dynamic variable using placeholder);

automatic resynchronization corrects for bit slippage;

automatic CRC replaces quad byte entry with dynamically calculated 32-bit CRC value;

dynamic placeholder replaces quad byte entry with dynamically changing values within traffic generated—hardware resource is modified each time script indexes to the placeholder—XGMII or raw placeholders are available for random words, incrementing words, random bytes, incrementing bytes, walking ones, and walking zero;

capture memory (16 bytes to capture received data; trigger data capture on single bit error or programmable BER threshold; specify pre or post-fill sizes relative to trigger event);

simulate loss of bit, byte or words (transmit any pattern in 64-bit or 66-bit increments for error detection verification; use 'send only' mode or error injection to simulate toggled bits, dropped bits, bit-shifted words, or misplaced control characters; simulate loss of synchronization conditions);

eye diagram support (clock/64 output signal from Xgig BERT can be connected to high speed oscilloscope as the trigger input, allows use of high bandwidth probe for displayed signal input);

logging function (user can specify log file name and save results after operation has been stopped); and scripting support (multiple Xgig BERTs can be controlled via a scripting language to support complex and long duration operations).

IV. General Operational Aspects of An Exemplary BERT Implementation

The following general discussion is directed to various operational aspects of an exemplary implementation of a BERT. Such discussion is not intended to limit the scope of the invention in any way however, and the operational, as well as physical, aspects of implementations of the BERT that are disclosed herein are exemplary only and may be varied as necessary to suit the requirements of a particular application or situation. Moreover, while the disclosure herein refers to various functionalities implemented by way of the BERT, it should be understood that the functionalities disclosed herein may be implemented by the BERT and/or by the BERT control software. The particular allocation of such functionalities between the BERT and such software may be implemented as necessary to suit the requirements of a particular application.

In general, implementations of the BERT 100 are configured to implement testing of the integrity and other aspects of network data paths and network devices. Exemplary implementations of the BERT 100 operate in connection with various networks and network devices that conform to both synchronous and asynchronous protocols such as, but not limited to, GE, 10 GE, FDDI, FC and 10 G FC, SONET and 10 G SONET, and x4 InfiniBand. Examples of such networks include, but are not limited to, WANs, LANs and SANs.

While at least some implementations of the BERT 100 are configured to both send and receive test bit sequences, such implementations are port-selectable so that the BERT 100 may be employed only for transmission, or only for reception/comparison of test bit sequences. With respect to the use of the BERT 100 solely for reception/comparison of test bit sequences, such functionality may be employed, for example, where a separate device is generating and transmitting the test bit sequence. In the transmit-only configuration, the user can perform all signal characterization without comparing the received test bit sequence with the reference test bit sequence.

The foregoing arrangement is exemplary only however and, more generally, embodiments of the BERT 100 may be configured and/or employed in any of a variety of different ways that make use of only selected aspects, or all, of the functionality of the BERT 100. Thus, one aspect of implementations of the BERT 100 is that they are well suited to be employed in a variety of different configurations and can be used in any number of different situations.

A. Aspects of the Generation and Use of Exemplary BERT Test Bit Sequences

As suggested above, an aspect of implementations of the BERT 100 is that the BERT 100 is configured to create, transmit and receive test bit sequences that can then be used to detect and evaluate errors, as well as to generate error rates, and to facilitate implementation of various remedial or other actions. Various types of test bit sequences are employed in this regard. For example, some implementations of the BERT 100 are configured to employ pseudo-random bit sequences ("PRBS") as test bit sequences. In other implementations, the BERT 100 is configured to permit the use of user-defined test bit sequences, including bit sequences that represent legal traffic for protocols such as 10 GE and 10 GFC. Still other implementations of the BERT 100 are configured to support both these, and other, types of test bit sequences. The scope of the invention should not, however, be construed to be limited to any particular type of test bit sequence, or combination of test bit sequences.

In connection with the foregoing, the BERT 100 enables customization of various aspects of user-defined, and other, bit sequences. For example, for each entry on a user-defined pattern word of 64 or 66 bits, the BERT 100 enables the user to specify assertion of a trigger pulse.

As another example, a user defined pattern typically includes a 'start word' or 'start word combination' that, when detected by the BERT 100, starts the 'compare' operation where the BERT 100 compares the received test bit pattern with the transmitted test bit pattern. In addition to the 'start word combination,' a user defined test bit pattern typically also includes a 'end word' or 'end word combination' that, when detected by the BERT 100, is used to terminate the 'compare' operation. Typically, the 'start' and 'stop' criteria are defined at the 10 gigabit medium independent interface ("XGMII")/media access control ("MAC") or 16 bit word level, based upon the applied module.

Among other things, the customization of a test bit pattern to include a 'start word combination' and an 'end word combination' enables a user to compare only selected portions of a test bit pattern, while skipping other portions. The skipped portion typically includes sections of idles or other fill words; this allows the BERT 100 to remain synchronized with the bit stream in the presence of network devices that add or drop fill words.

Another useful aspect pertaining to the use of the 'start' and 'stop' criteria in user-defined test bit patterns relates to the situation where corrupted bits occur in the data stream. In particular, where corrupted bits are encountered, the BERT 100 will count the number of corrupted bits and can thus provide on-the-fly calculation of the associated bit error rate ("BER"). In the event that a clock malfunction or other problem causes a bit to disappear, a phenomenon sometimes referred to as "bit slip," the comparator of a BERT may, absent the use of 'start' and 'stop' criteria, continuously report errors, since all of the received data is shifted 1 bit. However, the comparator of the BERT 100 readily prevents this from occurring by using the 'start' and 'stop' criteria, in connection with valid idles and fill words, to resynchronize to the bit stream at each 'start' word. This limits the length of time a slipped bitstream is compared, and thus prevents the measured error rate from becoming artificially high.

Exemplary implementations of the BERT 100 also facilitate customization of test bit sequences by enabling the insertion of placeholders in user-defined test bit sequences. Exemplarily, the placeholders are replaced in real time, by the BERT 100, with any of a variety of words or values, examples of which include, but are not limited to, random ("PRBS") words, incrementing words, incrementing bytes, walking ones, walking zeros, all ones, and all zeros.

In connection with the foregoing, the BERT 100 also enables a user to inject user-defined bit error rates, as well as enabling the user to inject single bit errors. Thus, testing procedures implemented by way of the BERT 100 can be readily customized to suit the requirements of a particular application or situation.

Further, even where the transmitted bit sequence is primarily not user-defined, such as in the case of a PRBS, the BERT 100 nonetheless enables a certain degree of customization. For example, some implementations of the BERT 100 provide for the specification of a variety of PRBS line balance options, wherein the line balance can be altered at various predefined intervals Thus, in one exemplary implementation; the BERT 100 provides the following line balance options: PRBS with no line balance adjustments; 72 zeros injected every $10^3$ bits; 72 ones injected every $10^3$ bits; 72 zeros injected every $10^6$ bits; 72 ones injected every $10^6$ bits; 72 zeros injected every $10^{12}$ bits; and, 72 ones injected every $10^{12}$ bits. Moreover, the length of the PRBS can likewise be defined as desired. Some PRBS lengths supported by exemplary implementations of the BERT 100 include PRBS $2^{31}$-1, PRBS $2^{23}$-1, PRBS $2^{15}$-1, and PRBS $2^7$-1.

B. Aspects of Exemplary BERT Transmission/Reception Operations

Not only are aspects such as the form and content of test bit sequences readily customizable, but aspects of the transmission of such test bit sequences can likewise be user-specified to suit operational or other requirements. For example, implementations of the BERT 100 enable a user to specify that a test bit sequence will be transmitted continuously by the BERT 100. The BERT 100 additionally, or alternatively, enables a user to transmit a test bit sequence a user-specified number of times. In other cases, a user can specify that no bit sequence be transmitted and that an alternative operation be performed. Examples of such alternative operations performed by the BERT 100 include sending one or more media-type and protocol-specific words, or sending nothing, as would occur when the optical transmitter, such as a laser, has been inactivated.

While control of the operations of the BERT 100 is achieved at least in part through the use of user-customizable test bit sequences, the control of aspects of the operations of the BERT 100 may be achieved in other ways as well. For example, operations of the BERT 100 can be commenced or terminated through the use of start and stop control options implemented within the BERT 100, In particular, exemplary implementations of the BERT 100 provide a bit to assert to start operation of the BERT 100, and also provide a bit to clear to stop operation of the BERT 100.

As suggested elsewhere herein, embodiments of the BERT 100 can be used to generate and transmit test bit sequences in connection with a wide variety of networks and devices conforming to various protocols. With respect to such networks and devices, it is often the case that the clock rate differs from one device to the next, within a particular network. Consequently, such devices, as well as network nodes in some instances, are typically configured to insert idles or fill words within a received bit sequence in order to compensate for such clock rate differentials. While the presence of such idles or fill words alters the bit sequence, exemplary implementations of the BERT 100 are nonetheless capable of detecting the presence of such idles or fill words within the bit sequence. This capability has various implications with respect to the operation of, and results obtained by, the BERT 100.

For example, because the BERT 100 can detect the presence of such idles and fill words within the bit sequence, the BERT 100 is able to skip over those idles and fill words when performing an error detection analysis. In some exemplary implementations, the BERT 100 simply removes the idle words from the sequence before performing an error detection analysis. Further, the ability of the BERT 100 to detect idles and fill words within the bit sequence enables the BERT 100 to readily determine when a received bit sequence is unsynchronized and, moreover, to resynchronize the identified unsynchronized sequence. Accordingly, even if a bit sequence received at the BERT 100 is unsynchronized for some reason, the BERT 100 is nonetheless able to resynchronize the received sequence and then make an error determination as to the resynchronized sequence.

Moreover, such functionality is not limited in terms of the protocols in connection with which it may be employed. More generally, the operational aspects of the BERT 100 may be implemented as necessary to suit the requirements of a particular protocol, or group of protocols.

With particular reference to the 10 GE protocol, for example, the BERT 100 uses a resynchronization technique, discussed in further detail below, that enables error detection and bit error rate calculation in connection with 10 GE networks. Generally, such resynchronization functionality is implemented automatically and enables, among other things, selective comparison of data packets for purposes of bit error rate testing. In the 10 GE context, for example, the BERT 100 compares respective payload data of the transmitted test bit sequence and received test bit sequence, but ignores the idle and fill words between data packets.

Among other things, this selective comparison functionality contributes to improved reliability of error detection and error rate calculation by eliminating consideration of extraneous changes to the data stream. As noted earlier, one way to implement such selective comparison functionality is through the use of a 'start word combination' and 'end word combination.'

C. Aspects of Exemplary BERT Data Capture Operations

In addition to controlling aspects such as the form, content, and transmission and reception of test bit sequences, implementations of the BERT 100 also enable the capture and storage of information concerning the occurrence of a particular triggering event during bit error measurements. In general, the BERT 100 provides for an exemplary capture size of 1024 KB, and permits the specification of what will be captured. For example, a user can specify that all traffic be captured or, alternatively, that only miscompared words be captured. In at least some implementations of the BERT 100, the user has the further option to specify the post/pre-trigger location as a percentage of the capture size.

A variety of other options are provided as well with respect to the control of the traffic capture functionality of the BERT 100. For example, implementations of the BERT 100 are configured to stop traffic capture according to various criteria. Exemplary options include, but are not limited to: stopping capture immediately (such as upon pressing a 'stop' button); stopping upon a particular word, with trigger-out option; stopping upon a miscompare, with trigger-out option; stopping upon reaching a selected BER threshold; stopping upon trigger-in; and, stopping upon loss of synchronization of the data stream, with trigger-out option. For the trigger output, the BERT 100 includes the following options: do nothing; pulse once per detected mismatch; and, pulse once per user-defined pattern option. In at least some implementations, the BERT 100 further enables a postfill operation that permits specification of a predetermined number of words to be captured after the traffic capture has been stopped.

With respect to the situation where capture is stopped upon reaching a selected BER level, various further options are included. In particular, exemplary choices for a BER threshold include, but are not limited to: capturing all traffic until selection of the 'stop' button; $10^{-9}$ bit errors/second; $10^{-6}$ bit errors/second; and, $10^{-3}$ bit errors/second. Of course, various other BER thresholds may likewise be defined and implemented.

In addition to the various functionalities concerning the creation, transmission, reception and capture of bit sequences, exemplary implementations of the BERT 100 also include registers configured to report various types of status information concerning BERT 100 operations. Exemplary unit statuses provided by implementations of the BERT 100 include, but are not limited to: state machine state; configuration clock rate; configuration protocol; wire status; ID of currently allocated card (or 'editor only' if running in 'editor only' mode); 'send' status; 'compare' status; elapsed time; BER; number of bits sent; number of bits compared; time since last error; run status; current date; current time; transceiver status bits; and, resynchronization occurred.

D. Aspects of Exemplary BERT Status Reporting Operations

The BERT 100 is also configured to report status information concerning specific BERT 100 components. For example, when the XBI port is in use, the BERT 100 provides the following exemplary status information: module held in reset (True/False); laser (optical transmitter) enabled (True/False); receive reference clock at either 161 MHz or 644 MHz; transmit reference clock at either 161 MHz or 644 MHz.

Status information concerning specific BERT 100 operations is also provided. For example, with respect to transmit operations, exemplary implementations of the BERT 100 provide the following 'transmit' statuses: 'send' state machine status; elapsed time; sent bits. Likewise, exemplary implementations of the BERT 100 provide various 'receive' statuses based upon the media type and/or protocol selected. Such 'receive' statuses include: bit error rate ("BER"); received bits, bytes, words, and loops; compared bits, bytes, words, and loops; mismatched bits, bytes, words, and loops; received bits since last error; received loops since last loop with at least one error; and, elapsed time since last error. Of course, various other 'receive' statuses, as well as 'transmit' statuses may likewise be defined and reported, and the foregoing exemplary statuses should not be construed to limit the scope of the invention in any way. In the event that the BERT 100 is configured for 'transmit only' operation, the 'receive' statuses simply report "N/A." In connection with the foregoing discussion, it should be noted that 'loop' transmission generally refers to the situation where the same bit sequence is repeatedly transmitted by the BERT.

In addition to the foregoing, exemplary implementations of the BERT 100 also provide information concerning signal and operating statuses. For example, a pictogram and/or LED are provided that report the status of the input optical or electrical signal. In particular, a black or extinguished LED represents a 'no signal' or 'no hardware' condition, while a white or illuminated LED represents a 'signal detected' status. As to operating status, a pictogram and/or LED are provided that report various states as follows: (Green) data stream synchronized, no errors detected; (Flashing Orange) mismatch detected, flash for 5 seconds when bit error reported, reset counter every time mismatch is reported; (Orange) mismatch detected, follows Flashing Orange LED in absence of loss of synchronization; (Orange) loss of synchronization detected, or returns to Flashing Orange when mismatch detected; and, (Transparent) BERT not operational or not connected to hardware. Note that the foregoing status schemes are exemplary only, and various other schemes may alternatively be devised and implemented.

E. Aspects of Exemplary BERT Persistence/Logging Operations

In order to promote the efficient use and operation of the BERT 100, various persistence options are implemented that allow ready re-use or recreation of various aspects of the BERT 100 test bit sequences and operations. Some examples of such persistence options include: reset custom configuration to default; load a protocol-specific hardware configuration file upon exchange of protocol; save the last used protocol upon application (software) exit; upon bootup, load a hardware configuration file specific to the last used protocol; save the last used clock rate upon application (software) exit; upon bootup, set hardware to digital passthrough at the last used clock rate; save test scripts (test bit sequences) via configuration files; support all previous configuration files; and, provide 'instrument' persistence. Additional, or alternative, persistence options make likewise be defined and implemented consistent with the requirements of a particular application.

Exemplary implementations of the BERT 100 provide for a variety of logging options concerning BERT 100 operations. For example, at least some implementations provide for the following logging operations: create optional log file to disk; provide default log filename and allow optional user specified filename; provide user-modifiable default value (in seconds) for interval update time between readings, where the interval update time is, exemplarily, selected from a range of 1 to 1000; provide a default value for the number of readings to be stored in a circular memory buffer, selected from an exemplary range of 1 to 10000; permit saving of statistics gathered in connection with various BERT components and operations.

As suggested by the foregoing, various types of logs may be defined and employed in connection with embodiments of the invention. In one exemplary implementation, a log is generated that describes a triggering event, discussed in detail elsewhere herein, and associated resynchronization, so that a user can analyze each event. This feature allows a user to test the integrity of a data path over a relatively long period of time in order to obtain a relatively more accurate measurement of a corresponding BER.

With regard to the log files, templates or other structure can be employed that ensure that certain basic information is included in each log file created and/or modified. For example, each log file may be configured to include: time/date of the start of the BERT testing evolution; protocol and clock rate of the BERT testing evolution; ID of the BERT unit running the test; BERT results; and, time/date of the end of the BERT testing evolution.

V. Aspects of Exemplary 'Send', 'Compare' and 'Capture' RAMs

As noted earlier, one aspect of exemplary implementations of the BERT is that the BERT exemplarily includes two internal RAMs, specifically, a 'Send' RAM and a 'Compare' RAM that, respectively, define the test bit sequence that will be sent, and compare the received test bit sequence to the transmitted test bit sequence. As a general discussion of certain basic aspects of an exemplary BERT implementation and associated functionality is facilitated somewhat through particular reference to aspects of such functionality as are implemented by way of the RAMs, consideration will first be given to a brief discussion of various aspects of exemplary RAM implementations.

A. Basic RAM Functional Aspects

Exemplarily, the RAMs are each configured to hold data words up to 66-bits wide, as well as holding various control bits. In most implementations, the 'Send' RAM and 'Compare' RAM are loaded with identical data, meaning that the bit sequence that is received will be compared to a bit sequence identical to that sent. Further, the control bits contained in the RAMs are configured to implement a variety of functions, examples of which include inserting automatic placeholders in a bit sequence, inserting an automatically generated cyclical redundancy check ("CRC") in a bit sequence, and supplying control codes for each data byte in XGMII mode. As disclosed elsewhere herein, the placeholder function inserts a dynamically-calculated word into the data stream. Exemplary placeholder types include, among others, PRBS (with four programmable polynomials), incrementing words/bytes, walking ones/zeros, and all ones/zeros. The CRC function calculates the CRC over a user-defined portion of the data and inserts the calculated value into the data stream.

Generally, the 'Compare' RAM enables allows the test bit sequence transmitted from the 'Send' RAM to be regenerated on the receive side of the BERT, using a 'receive' clock that may be asynchronous with the 'send' clock. The regenerated test bit sequence can then be compared with the transmitted test bit sequence, as described elsewhere herein.

B. RAM Send Modes

Exemplary implementations of the BERT 300 are configured to transmit bit sequences in various modes, examples of which include raw 64-bit, raw 66-bit, XGMII, and continuous PRBS. The first three of the aforementioned modes send a bit sequence that resides in the 'Send' RAM while, when the BERT 300 is in the PRBS mode, the BERT 300 sends the output of a PRBS generator, which is typically configured to update every word. More particularly, the continuous PRBS mode is implemented by way a sub-mode that permits a single word from the memory to be sent continuously. The effect achieved by setting up this single word as a PRBS placeholder is the continuous transmission of the output of a PRBS generator.

In the raw 64-bit mode, 64-bit data words in the 'Send' RAM are sent 'as is.' One 64-bit word is sent per transmit clock. The raw 66-bit mode is similar, except that 66-bit words are defined, and internal 'gearbox' (rate-changing) logic converts the 66-bit words to 64-bit output words. In particular, thirty two (32) 66-bit words are output every 33 transmit clocks (66*32=64*33). Among other things, this mode is useful for emulating a normal 10 GE data path, which outputs 66 bit words (2 synchronization bits +64 data bits), but enables full control over the bits sent. In both the 64-bit and 66-bit raw modes, the user must ensure that the data sent is DC balanced and includes sufficient transitions for reliable transmission onto the network.

As used herein, a 'DC balanced' data stream refers to a data stream containing an approximately equal number of 1 and 0 bits over a predetermined period of time. With respect to 'transitions' in the data stream, such transitions generally refer to a change from a 1 to a 0 or a 0 to a 1 in the data stream. In the case of 10 GE devices and networks, for example, such a transition occurs at least once every 66 bits. In at least some implementations, the host software is configured to present, by way of the GUI, information concerning the DC balance of, and number of transitions in, a particular data stream. The host software also generates appropriate warnings, such as when a particular DC imbalance is noted and/or when the number of transitions falls below a minimum acceptable level.

In XGMII mode, the data in the 'Send' RAM bears no resemblance to the bits transmitted to the network. This is due to the presence of block encoder and scrambler modules in the data path. These modules implement the 64/66 b coding standard specified for the 10 GE protocol. There is also no requirement for DC balance or transition density in the input XGMII codes.

In the XGMII mode, the user is able to define each output word as a block of eight XGMII codes, where each code is 8 data bits +1 control bit. Internal BERT logic encodes each block of 8 codes into a 66-bit frame, as defined by the 10 GE standard. A 66-bit frame consists of 2 synchronization bits +64 data bits. A scrambler is then applied to the data portion of the frame to create transitions and DC balance. The 66-bit frames are then converted back to 64 bits by a 'gearbox,' as described above, and transmitted onto the network. As in the case of the raw 66-bit mode, thirty two (32) 66-bit words sent every 33 transmit clocks.

C. RAM Compare Modes

In raw 64-bit, raw 66-bit and continuous PRBS modes, the raw bits received are compared to the raw bits sent. For raw-64 and raw-66 bit modes, a start word is used to synchronize the pattern on the compare side. PRBS mode is self-synchronizing, in that the current bits received determine the expected subsequent bit sequence. In the XGMII mode, on the other hand, data can be compared either at the raw bit or decoded (XGMII) level. In the raw compare mode, received bits are compared to the raw bits sent, that is, the XGMII data after encoding and scrambling. In decoded compare mode, the XGMII data decoded from the received bits is compared to the original XGMII data defined in the script. Note that as used herein, 'script' means, and may also be referred to as, user patterns or bit sequences.

Generally, the XGMII raw bit compare mode, as well as the raw 64-bit, 66-bit, and PRBS modes, are best suited for use with analog-passthrough type devices which return a bit-for-bit copy of the data sent. Network devices that perform retiming, add or drop idles, or otherwise affect the data stream can also be tested in the XGMII raw bit compare mode, but impose certain additional requirements, as discussed below. Because such devices typically employ internal scramblers that are not synchronized to the transmit scrambler of the BERT, the actual bit sequence returned to the BERT will be substantially different from the transmitted bit sequence, even though the XGMII data coded in the bit stream remains the same. Thus, decoded compare mode is well suited for these devices.

However, decoded compare mode does not compare the actual bits received on the medium, so it cannot provide a true bit error rate measurement, as does raw bit compare mode. Where raw bit compare mode is used with retiming devices (those that may add or drop fill words), the actual bits received by the BERT cannot be compared to the actual bits sent, but the bits received can be compared to the bits that should be received ("expected" bits), once the BERT has properly synchronized to the received bit sequence. This synchronization is performed using the 'start' and 'stop' criteria as discussed previously.

With respect to operation of the BERT in the XGMII raw bit compare mode, there is no 1-to-1 correspondence between an XGMII word and its scrambled data value, or bits sent on the network, since the scrambled value depends on the data that was previously transmitted and, in the case of constant data, the number of words that were transmitted. Accordingly, synchronization, or 'start' criteria detection, which in one specific case comprises 'start word' detection, is implemented at the decoded level. The received bits are descrambled and decoded to yield the original XGMII data, and this data is then compared with the XGMII 'start' word. When the 'start' word is found, the raw, or scrambled, bits that yielded the 'start' word are used to seed an internal compare scrambler.

Exemplarily, the internal compare scrambler is the last stage of a 'compare' datapath (FIG. 3A) that starts with the original XGMII data in the 'Compare' RAM 306. This original XGMII data passes through a block encoder 334 and then into the 'compare' scrambler 336. Seeding the 'compare' scrambler 336 with the raw received data that corresponds to known XGMII data, that is, the start word, synchronizes the 'compare' scrambler to the 'transmit' scrambler in whatever device is generating the data received by the BERT. This 'transmit' scrambler, often resides in the particular network device being tested. The output of the 'compare' scrambler is then a bit-for-bit copy of the output from the 'transmit' scrambler, and is used as the comparand data for the raw received bits.

In the case of devices which perform only the equivalent of analog passthrough, the aforementioned process and method ensures a bit-for-bit comparison of the sent bits to the received bits. In the case of devices such as retiming devices however, the received bits are not the same as the transmitted bits. In view of the fact that the device has transmitted a known word, the start word, correctly however, the expected bit sequence from that point until the next traffic modification, such as the add/drop of an idle word, is known and can thus be compared. In this respect then, the actual bits on the medium can still be compared for retiming devices, but not to the actual bits sent.

Where the BERT is set to test retiming devices, the BERT will seed the 'compare' scrambler at every start word detection, since the traffic may have changed in the resynchronization zone before the start word. If the BERT is set to test non-retiming devices, the BERT will seed the 'compare' scrambler only on the first start word. Since non-retiming devices cannot modify the network traffic, the 'compare' scrambler value at the first start word forms the basis for the determination of all subsequent expected values.

D. RAM Capture Modes

In general, the 'Capture' RAM is a memory for capturing received data based on particular pre-defined events. The processing of such captured data by the BERT is described elsewhere herein. Exemplarily, the 'Capture' RAM consists of 128-bit entities, where each such entity corresponds to a single 64-bit or 66-bit received data word. In the case of the raw 64-bit or raw 66-bit compare modes, discussed above, the data words are the actual bits received at the BERT from the network. In the XGMII modes however, the data words can be either the actual bits received at the BERT from the network, or the decoded data.

VI. General Aspects of Testing Processes As Implemented by an Exemplary BERT

Figure 3A:
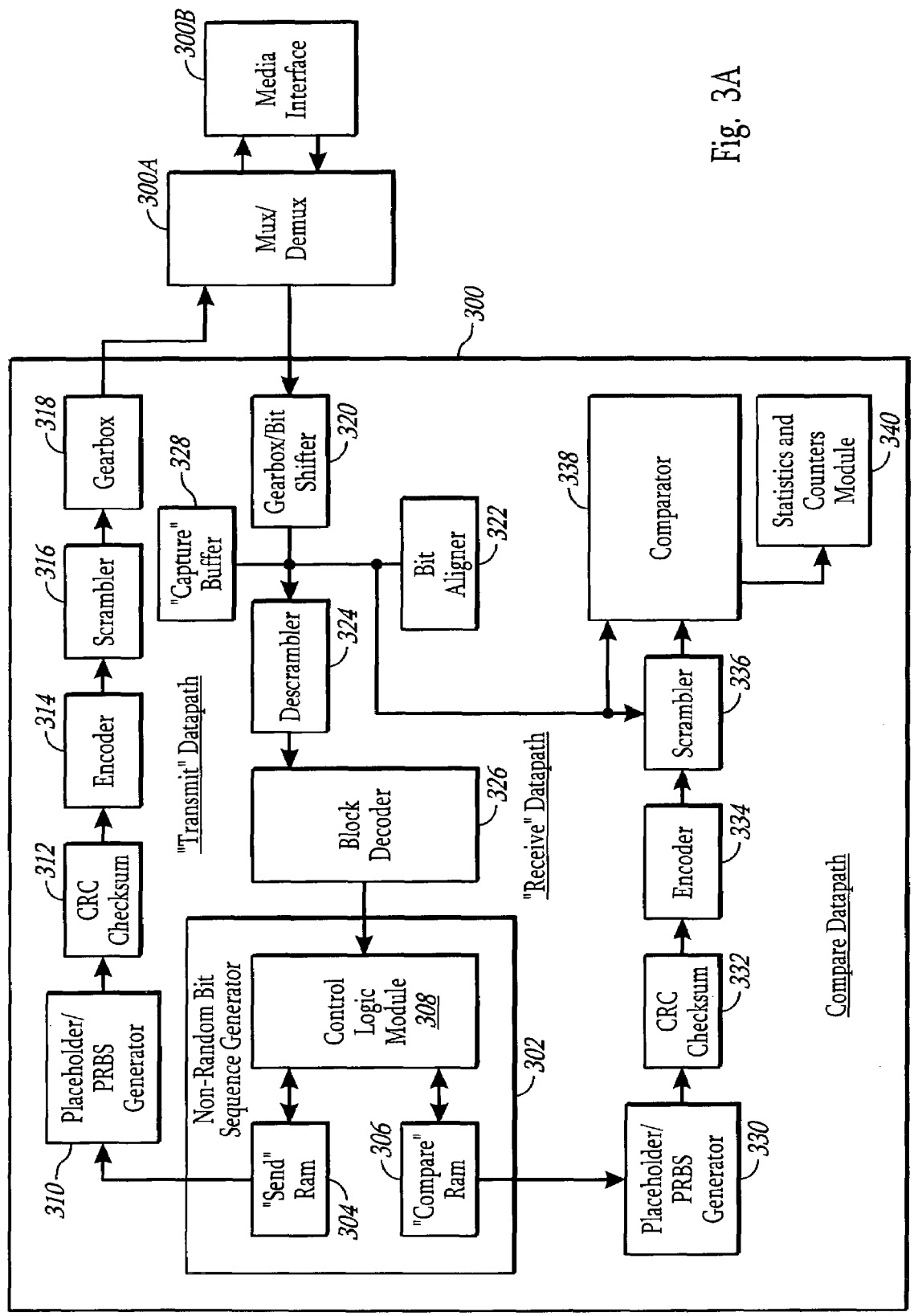
FIG. 3A is a high-level component diagram that illustrates aspects of basic components of an exemplary implementation of an error rate tester, and also indicating various relationships between such components.

With the foregoing discussion of exemplary 'Send,' 'Compare' and 'Capture' RAM configurations and operations in view, attention is directed now to FIG. 3A where details are provided concerning high-level components of an exemplary implementation of a BERT. For reference purposes, renewed attention is directed to FIG. 2 as well, where aspects of exemplary data paths and component connection arrangements are illustrated.

Exemplarily, this implementation of the BERT provides error rate measurement, at bit granularity, on data paths that include data altering components such as encoders and scramblers. Thus, this exemplary embodiment of the BERT is well-suited for use in connection with high-speed networks, such as those operating at line rates of about 10 Gbps or higher, using protocol specific traffic.

The implementation of the BERT is designated generally at 300 in FIG. 3A, and defines 'transmit' and 'receive' datapaths through which the BERT 300 communicates with the network 200, and further defines an internal 'compare' datapath that facilitates implementation of various error rate operations by the BERT 300. Generally, the 'transmit' and 'receive' data paths are cooperatively defined by the BERT 300, a multiplexer/demultiplexer 300A and a media interface 300B configured to electrically or optically connect the BERT 300 with the network 200 (FIG. 2). Exemplarily, the multiplexer/demultiplexer 300A comprises a 16/64 multiplexer/demultiplexer, while the media interface 300B comprises a 300 pin XBI connector. Other implementations of the multiplexer/demultiplexer 300A and/or media interface 300B may alternatively be employed however.

The 'send' and 'receive' datapaths, as well as the 'compare' datapath, all pass through, or otherwise communicate with a non-random sequence generator 302 that configured to generate and transmit various bit sequences. In particular, some of such bit sequences are defined in the 'Send' RAM 304 and, as disclosed elsewhere herein, are transmitted onto the network 200 (FIG. 1) by way of the 'transmit' datapath and are then received back at the BERT 300, by way of the 'receive' datapath, for analysis. Yet other bit sequences are defined in the 'Compare' RAM 306 and are transmitted along the 'compare' datapath so as to enable analysis of the bit sequence defined in the 'Send' RAM and received back from the network 200 on the 'receive' datapath. Both the 'Send' RAM 304 and the 'Compare' RAM 306 communicate with a control logic module 308 that, as disclosed elsewhere herein, provides various control functionalities concerning BERT 300 operations. Exemplarily, the 'Send' and 'Compare' RAMs are implemented as 2K×128 RAMs.

With more particular reference now to the 'transmit' path, bit sequences to be transmitted onto the network may be generated in various ways. Generally, and as discussed elsewhere herein, two types of bit sequences may be employed. In some implementations bit sequences are defined by a user and stored for subsequent transmission. Such user-defined bit sequences may include dynamic aspects, such as placeholders. In addition to user-defined bit sequences, yet other bit sequences are generated randomly, such as by a PRBS generator. Thus, bit sequence generation may occur at, for example, a random sequence generator such as a PRBS generator, or at non-random sequence generator 302, each of which may be more generally referred to herein as a 'sequence generator.'

Note that while the non-random sequence generator 302 facilitates regeneration of PRBS sequences that have been transmitted onto the network, such regeneration is for comparison purposes only. Accordingly, such regenerated sequences are not considered to be randomly generated bit sequences, notwithstanding that the regenerated sequence reflects a PRBS or other random sequence that was initially generated to be transmitted onto the network to enable testing.

In one exemplary implementation, the output side of the 'Send' RAM 304 serves as a part of the 'transmit' path along which a predefined bit sequence from the 'Send' RAM 304 is transmitted. In this implementation, the transmitted bit sequence passes unchanged through a placeholder/PRBS generator 310 located downstream of the 'Send' RAM 304 and that, as disclosed elsewhere herein, is capable of generating random bit sequences and other types of bit and word sequences. In connection with the foregoing arrangement where the bit sequence is unchanged as it passes through the placeholder/PRBS generator 310, it should be noted that, more generally, any or all of the modules in the datapath can be bypassed, so that, for example, if the user is not using random bit sequences or placeholders, the control logic module 308 will command the placeholder/PRBS generator 310 to simply pass through the data at its input to its output.

Figure 4:
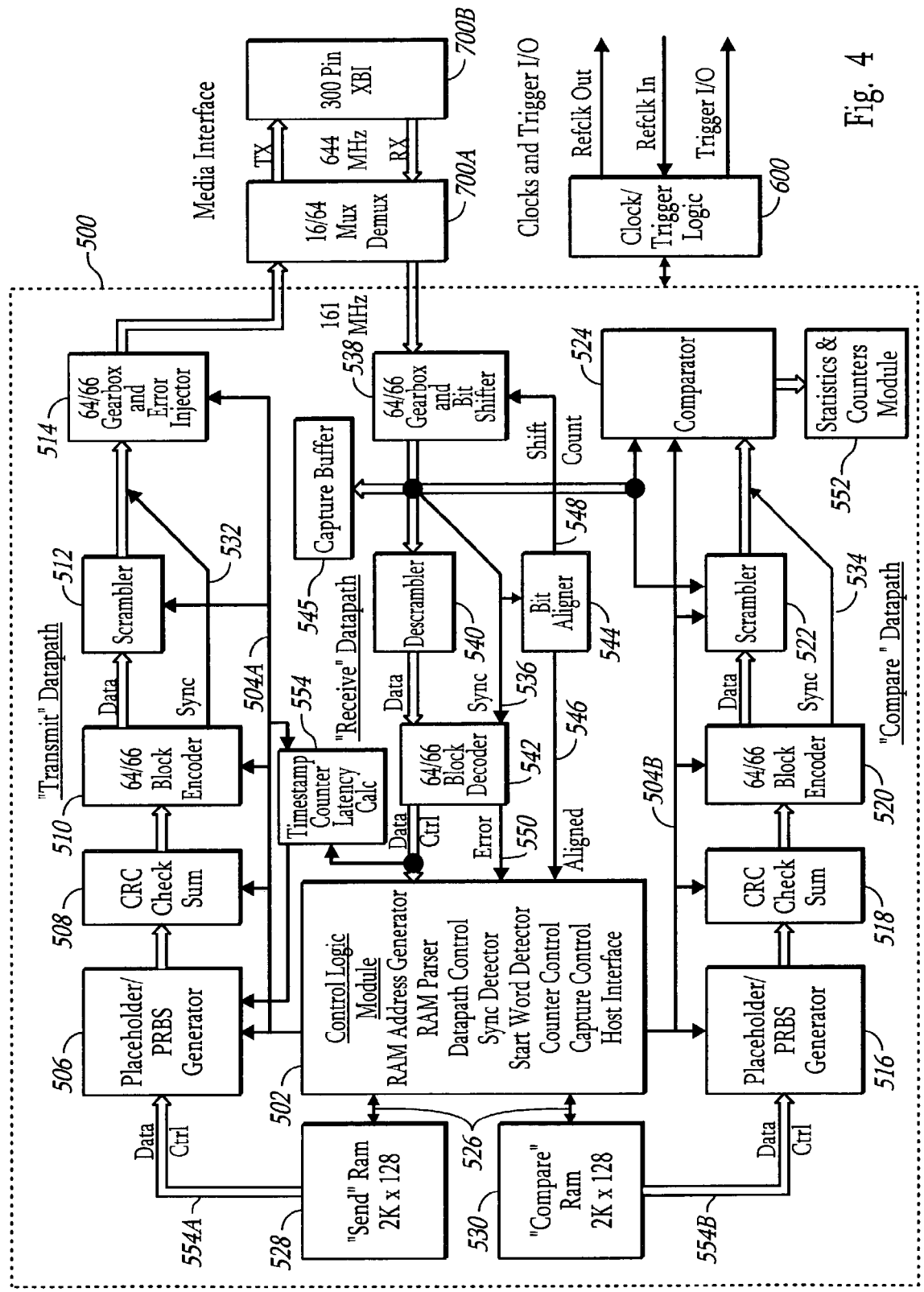
FIG. 4 is a low-level component diagram that illustrates various aspects of data flow and related operations in an exemplary embodiment of an error rate tester.

In an alternative implementation, the 'Send' RAM 304, guided by the control logic module 305, transmits instructions to the placeholder/PRBS generator 310 that causes the placeholder/PRBS generator 310 to generate a bit sequence. In this implementation then, no bit sequence is transmitted from the 'Send' RAM 304. Thus, the output side of the 'Send' RAM 304 in this implementation functions as a control signal path and not a data path. In either implementation, the relevant operations are implemented in response to control signals transmitted by the control logic module 305 over a suitable control bus (FIG. 4).

In any case, once the bit sequence passes through the placeholder/PRBS generator 310, the bit sequence is then transmitted to a CRC checksum module 312 that checks and inserts a CRC value into the bit sequence prior to further transmission of the bit sequence. After processing by the CRC checksum module 312, the bit sequence is then encoded and scrambled by encoder 314 and scrambler 316, respectively. Exemplarily, the encoder 314 is implemented as a 64/66 block encoder. Such encoding and scrambling is only performed however, if the BERT is transmitting in XGMII mode. If the BERT is transmitting in raw 64-bit or raw 66-bit mode, no encoding or scrambling is performed. The bit sequence is then converted, by gearbox 318, exemplarily implemented as a 66/64 gearbox/error injector, back into a form suitable for transmission onto the network. This operation is only necessary if the BERT is transmitting in a mode that uses 66 bits per word, such as raw 66-bit or XGMII. If necessary, the bit sequence is multiplexed by the multiplexer/demultiplexer 300A before transmission onto the network through the media interface 300B.

After the bit sequence has traveled through the network 200, it returns through the media interface 300B and is demultiplexed, if necessary, by the multiplexer/demultiplexer 300A before returning to the BERT 300. The returned bit sequence is then bit aligned by a gearbox/bit shifter 320 operating in cooperation with a bit aligner 322. Exemplarily, the gearbox/bit shifter 320 is implemented as a 64/66 gearbox/bit shifter. Note that the gearbox/bit shifter 320 and the bit aligner 322 may be collectively referred to herein as a 'bit synchronizer,' and, similarly, the processes performed by such components may be collectively referred to herein as 'synchronization.' It should likewise be noted that such 'bit synchronization' is distinct, and different, from the 'start' word synchronization disclosed elsewhere herein. After the received bit sequence has been thus aligned, the bit sequence is descrambled by descrambler 324, and then decoded by a decoder 326 that communicates with the control logic module 306. As suggested above, such decoding and descrambling is only required where the BERT 300 is operating in XGMII mode. A capture buffer 328, in communication with the 'receive' datapath, is also provided that receives the bit sequence after the bit sequence has passed through the gearbox/bit shifter 320.

Once the transmitted bit sequence has returned from the network, the BERT 300 is then able to implement various evaluation and analysis processes. In particular, the bit sequence that is to be used for comparison with the returned bit sequence is either retrieved from the 'Compare' RAM 306 or is regenerated by the random bit sequence regenerator 330, exemplarily implemented as a placeholder/PRBS generator. In either case, control of these operations is implemented by way of the control logic module 308 acting through a suitable control bus (FIG. 4).

Once the comparison bit sequence has been retrieved, or regenerated, as applicable, that bit sequence is then transmitted to a CRC checksum module 332 that regenerates the same CRC that was transmitted. Next, the bit sequence is encoded and scrambled by encoder 334, exemplarily implemented as a 64/66 block encoder, and scrambler 336, respectively, and then placeholder/PRBS passed to the comparator 338 for comparison with the returned bit sequence. The comparator 338 then provides the comparison results to a statistics and counters module 340.

As suggested by the foregoing discussion concerning 'transmit' and 'compare' processes, such as in the 64-bit and 66-bit raw bit modes for example, various modules of the BERT 300 may be bypassed in some instances. More generally, the BERT 300 allows the user to optionally bypass any of the modules in the 64/66 datapath. As another example, a user may optionally disable the encoder and specify that the data be fed to the scrambler directly. Among other things, such functionality allows the user to create either legal traffic or arbitrary traffic with user-defined protocol errors.

Moreover, implementations of the BERT enable the user to select and implement, with a single BERT, various operational modes. More particularly, the BERT enables the user to select various 'protocol' modes, such as where the user specifies bit sequences at the XGMII level that conform to the 10 GE/10 GFC protocols, raw bit modes such as the 64-bit and 66-bit modes, or a PRBS output mode. Such flexibility is particularly useful in view of the multitude of network types and protocols.

Another aspect of BERT implementations is their ability to transmit user-defined bit sequences, that use the 64/66 coding datapath, while still enabling comparison of the data at the raw bit level. In contrast, typical protocol-based "error testing" devices generally only compare the data after decoding, and thus do not measure a true BER. Moreover, known devices that do test at the bit level do not support protocol traffic, only PRBS or raw data, which is not understood by protocol-specific devices.

Figure 3B:
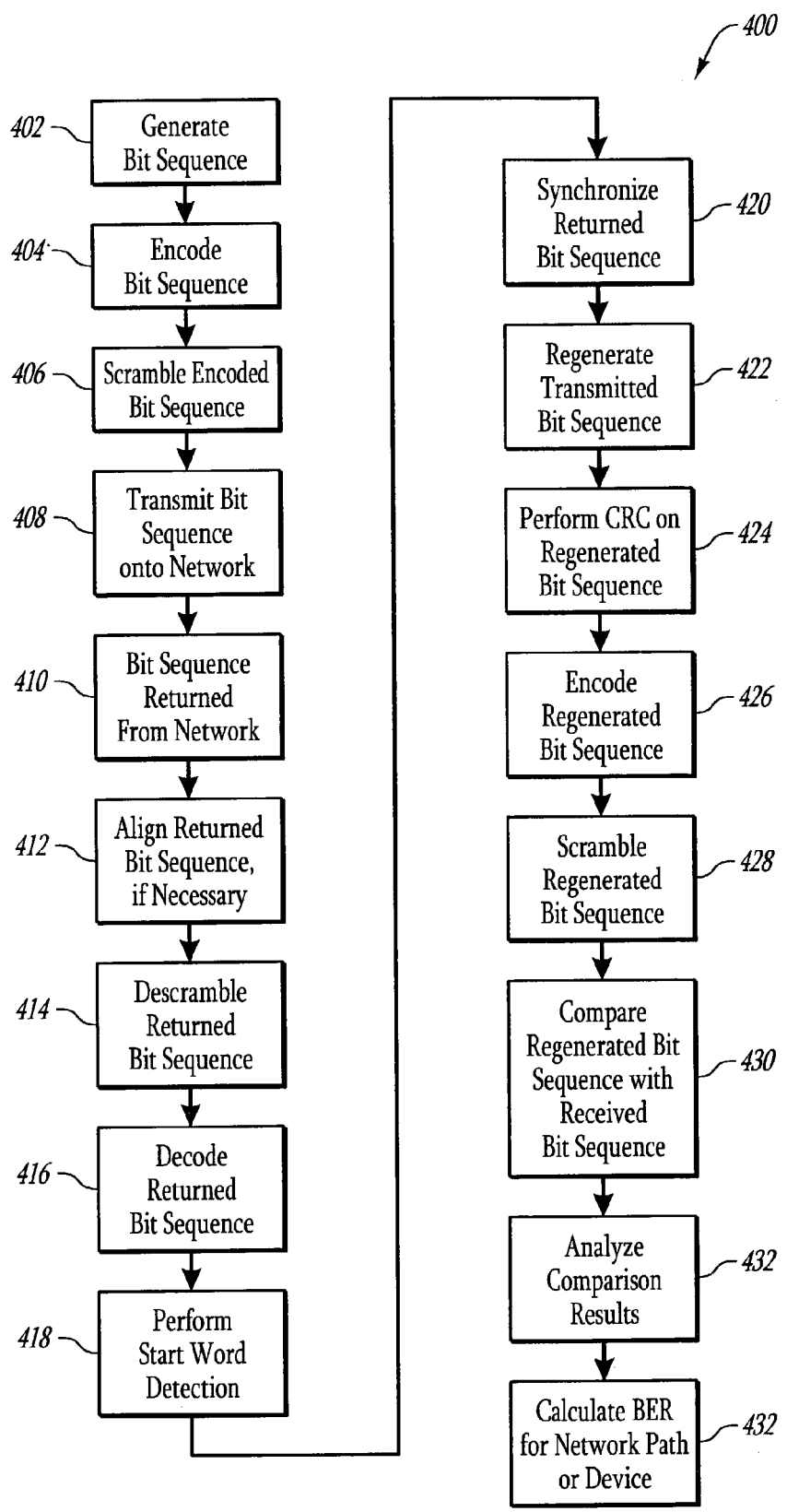
FIG. 3B is a flow diagram that illustrates various aspects of an exemplary bit error rate testing method implemented at bit granularity by an error rate tester.

With reference now to FIG. 3B, and with continuing reference to FIGS. 2 and 3A, more specific details are provided concerning an exemplary bit error rate testing method 400 implemented at bit granularity by the BERT 300. At state 402 of the process 400, the non-random sequence generator 302 generates a bit sequence that will be used in connection with various tests and diagnostics performed concerning operational and other aspects, such as determination of a BER, of one or more network paths and devices. Typically, the bit sequence is generated using pre-stored data from the 'Send' RAM, and transmits the generated bit sequence, or test bit sequence or script, onto the network. It should be noted that, in exemplary implementations, the 'Send' and 'Compare' BRAMS are each loaded with identical data. In some implementations, error detection performed by the BERT involves a looping process where the same bit sequence or word pattern is transmitted on the data path repeatedly over a period of time. In other cases however, such as where 64:66 coding is employed, the XGMII data is the same every loop, but the bits transmitted on the medium differ from one loop to the next.

In some implementations, a user assists in the creation of bit sequences or patterns by way of a host attached to the BERT, such as by way of port 108 (FIG. 2). In particular, a graphical user interface ("GUI"), implemented as a part of software resident on the host, enables a user to define, save, and reuse bit sequences. As disclosed elsewhere herein, various other persistence options are likewise made available to the user through the software. Exemplary functions implemented by the software, through user interaction with the GUI, include word length selection, placeholder definition, a specific packet/frame selector for jitter measurements, a copy/paste/cut option and a CRC control command. Additionally, the GUI is configured to display various status information, details of which are disclosed elsewhere herein, such as a count of mismatched bits, a count of mismatched words, bit error rate calculation, elapsed time and total number of compared bits, elapsed time and number of bits since last error, and a count of the number of detected loops with at least one error.

It was noted earlier herein that a user-defined bit sequence such as are employed by exemplary BERT implementations may include one or more placeholders that command the insertion of a dynamically-generated data word into the bit sequence. Depending on the type of placeholder, such data words may be PRBS based random numbers, incrementing words, incrementing bytes, walking ones and zeros, all ones and zeros, or other types of dynamically generated data. By way of example, the bit sequence or word pattern may be defined at the XGMII level, a MAC interface for the 10 GE Protocol, and placeholders may be inserted as XGMII data, creating, for example, random frame payloads.

Alternatively, the placeholders may be sent as-is to create a raw bit pattern. These defined placeholders may be filled by the placeholder/PRBS generator 310 using random words, incrementing words, incrementing bytes, walking ones and zeroes, or all ones or zeroes. Further, the BERT is configured to employ automatic CRC insertion, such as by way of CRC checksum module 312. Generally, automatic CRC insertion is useful whenever there is any placeholder in the predefined data pattern, such as a random number for example, since the data generated by that placeholder changes every loop, even though the data in the memory remains the same.

With continuing reference now to FIG. 3B, generation of the test bit sequence causes the process 400 to advance to states 404 and 406 where the encoder 314 and scrambler 316 of the BERT 300 encode and scramble, respectively, the test bit sequence. In 10 GE applications, at least, such encoding involves outputting thirty two (32) 66-bit words every 33 transmit clocks (66*32=64*33).

Exemplarily, such encoding is implemented by way of a 64:66 encoder that, for example, alters a first or initial bit sequence B to the second bit sequence B'. The bit sequence B' is transmitted to a scrambler 306 that alters the second bit sequence B' to a third bit sequence B". This third bit sequence B" is then transmitted onto a network data path, as described below.

After the bit sequence has been thus encoded and scrambled, the process 400 advances to state 408 where the test bit sequence is transmitted along a data path defined by various network devices and nodes, before ultimately returning, at state 410, to the BERT 300 through the 'receive' port.

Exemplarily, the bit sequence returns to the BERT 100 as, for example, a return bit sequence B'''. In the case of non-retiming devices, the returned bit sequence should match bit-to-bit to the third bit sequence B". For retiming devices however, the BERT will use the portion of the received sequence B'" that decodes to the 'start' word to seed the compare scrambler. The output of the 'compare' datapath, to which the received data is compared, will then be synchronized to received sequence B'", which in general will not be the same as sequence B". As discussed below however, if errors occur within the return bit sequence B'", such errors may further alter the bit sequence as it travels through components on the receive path. Note that the foregoing, and following related discussion, only applies to the decoded 'compare' mode, since in raw bit 'compare' mode, the comparison occurs at the B'" level indicated above. As suggested by the foregoing, one useful aspect of the raw 'compare' mode is that there is no error multiplication. In particular, the output of the 'receive' datapath descrambler/decoder is only used to detect the 'start' word.

With continuing reference now to FIG. 3B, descrambling and decoding of the returned bit sequence by the BERT causes the process 400 to advance to state 412 where the received bit sequence, which may have been de-serialized or de-multiplexed, is aligned by the gearbox/bit shifter 320 and bit aligner 322. Generally, the gearbox/bit shifter 320 and bit aligner 322 shift the bit sequence until the received bit sequence has the same alignment as the transmitted sequence. Among other things, such functionality allows the BERT to operate on a relatively broader network scale and provides realignment functionality in the event that the returned test bit sequence is not synchronized when initially received at the BERT.

It should be noted that the foregoing are exemplary implementations of alignment functionalities and, accordingly, are not intended to limit the scope of the invention in any way. More generally, any other arrangements effective in implementing alignment functionality, or comparable functionality, may likewise be employed. With more specific reference to the alignment state, any lost or corrupted bits within the received test bit sequence, or clocking errors in the received test bit sequence, are detected, thereby allowing the received test bit sequence to be realigned. In the XGMII mode, the two sync bits used in 64/66 b coding are used to perform alignment. In raw bit modes, 'start' word detection is used. In each mode, the gearbox/bit shifter 320 and bit aligner 322 continuously shift the received datastream until the alignment criteria is satisfied. In the XGMII mode, satisfaction of the alignment criteria is indicated by several consecutive valid sync bits, while satisfaction of the alignment criteria in the raw modes is indicated by a 'start' word match. Note that the PRBS mode does not require alignment of data sequences, as PRBS sequences are inherently self-synchronizing.

The process 400 next advances to states 414 and 416 where the BERT descrambles and decodes, respectively, the return test bit sequence. As suggested earlier, the transit of the return bit sequence B'" through devices such as the descrambler 324 and the decoder 326 tends to further amplify an error or errors present within the return bit sequence B'". Specifically, the descrambling and decoding of a return bit sequence B'" that includes one or more errors, may result in further errors being generated in the bit sequence and may not provide the error bits sharply and clearly to the comparator 338. It should be noted that, as used herein, components such as a encoder, scrambler, descrambler, and decoder, refer to those components as defined and described in connection with the 10 GE Protocol.

In conventional testing systems and devices, such additional errors from descrambling and decoding would be identified during an error detection measurement and may be erroneously attributed to the network path that is being tested. Accordingly, bit error calculations may not be performed using the first bit sequence B if bit error measurements of the true received bits at bit granularity are desired. This problem is particularly significant in high data rate networks where bit sequence altering components are used within the BERT 300. As discussed in further detail below however, embodiments of the BERT perform comparisons at the raw bit level, and employ idle and filler word detection that allows the BERT to overcome clock differences resulting from clock conversions between network devices such as, for example, from an XAUI clock to a reference clock, and corrupted or discarded bits within the returned bit sequence that may cause loss of synchronization.

Exemplary implementations of the BERT and associated processes provide for other functionality as well with respect to the returned bit sequence. For example, at least some implementations provide for a 'snoop' capability that provides data relating to and/or surrounding a detected error to be stored and provided for later analysis. Among other things, the snoop aspect enables a bit granularity error measurement on a bit sequence. In one embodiment, a copy of the received bit sequence is stored within a snoop buffer 328, exemplified as a FIFO buffer. used to store and provide data in the event an error is detected. Once an error is detected by the comparator 338, a snoop buffer control may request that particular data within the snoop buffer 328 be stored for later analysis of the detected error. Additionally, control information may be stored to provide more information to a user for analysis.

Further, the snooping capability also allows for relevant data to be stored when a particular triggering event occurs during bit error measurements. One example of a triggering event is the occurrence of a bit miscomparison between the third bit sequence B" and the return bit sequence B'". A triggering event may also be defined as the point where the BER crosses a predefined threshold. Such triggering events and thresholds may be integrated within the BERT 300 or, alternatively, may be defined by a user.

Once a triggering event occurs, the return bit sequence within the snoop buffer 328 is stored for analysis. For instance, all of the data stored within the snoop buffer 328 surrounding an error bit is stored so that details relating to the error can be readily analyzed. Further, details concerning a resynchronization that results after occurrence of a trigger condition may likewise be stored and subsequently analyzed. Also, information concerning multiple triggering events and resynchronizations can be stored and evaluated. In some instances, it is useful to present this information in a graphical format, such as by plotting bit error counts and/or BER as a function of time.

As disclosed elsewhere herein, other characteristics of this snoop and capture aspect may be defined by a user. Thus, a capture may be defined to require storage of all traffic within the snoop buffer 328, storing only miscompared words, stopping capture upon a specific word with a trigger-out option, stopping capture upon a miscompare with trigger-out option, immediately stopping the error measurements, or stopping capture upon trigger-in.

Among other things, such snoop and capture aspects, in cooperation with bit error measurement at bit granularity, enable the BERT to operate on various types of networks having different data rates. Examples of such networks include, but are not limited to, high speed networks such as OC-192 or 10 GE networks.

After the received test bit sequence has been descrambled and decoded, as required when the BERT 300 is in the XGMII raw bit mode for example, the process 400 advances to state 418 where the aligned bit sequence is forwarded to the control logic module 308. Among other things, the control logic module 308 detects the presence of, and identifies, 'start' and 'end' words in the returned test bit sequence. Such start word and end word detection enables the receiver to skip over idles and fill words which may have been added to or dropped from the sequence by the device(s) or network under test. This capability also ensures synchronization, at state 420, of the comparison of the received bit sequence to a regenerated bit sequence, using the pre-stored data in the memory. The ability of embodiments of the invention to detect, and compensate for, such idles and fill words makes such embodiments particularly useful for employment in connection with networks and devices where idles and fill words are used, such as 10 GE networks, systems and devices.

With more particular reference to the aforementioned identification and detection processes, the control logic module 308 is adapted to identify this start word of a word pattern by identifying a defined value(s) for start words in a bit sequence, either by identifying a pre-defined value(s) for start words or receiving the start word from the non-random sequence generator 302. The control logic module 308 may also identify end words in the bit sequence so that BERT 300 knows when to terminate a comparison process.

By identifying the start of the returned test bit sequence, the control logic module 308 enables the comparator 338 to compare the received bit sequence to the sequence stored in the 'compare' RAM 306. In the case of a 10 GE implementation for example, the 10 GE protocol has defined start word patterns that the control logic module 308 uses to identify in order to find a start word within a data stream. Typically, although this is not required, the BERT 'start' word would include the corresponding protocol 'START' character, for example, the control character 'FB' in XGMII, since this character is likely to immediately follow an idle/fill word section, and thus indicate the start of the data to be compared. The end word, within the data stream, will be identified so that idles are not included in the comparison. Consequently, the bit sequence to compare within the 10 GE data stream can be readily identified from start to end.

When the 'start' word is identified, the comparator 338 is enabled, and after the 'end' word is identified, the comparator 338 is disabled. Thus, the comparison occurs only on bits between a start word and an end word. That is, the data between the start word and end word comprises the 'compare' zone, and the data outside this region is in the 'no-compare' zone. Among other things, this functionality enables testing of networks and devices, notwithstanding that such networks and devices may add/drop idles and/or fill words from the datastream.

After the received bit sequence has been synchronized for comparison, the process 400 advances to state 422 where the expected bit sequence is regenerated by the placeholder/PRBS generator 330 based upon data in the 'Compare' RAM 306. The regenerated bit sequence is passed to CRC checksum module 332 at state 424 for regeneration of the transmitted CRC, if enabled, and then encoded at state 426 and scrambled at state 428, respectively, by encoder 334 and scrambler 336. The output of this stage is the 'expected' data.

The control logic module 308 then activates the comparator 338 and the process 400 advances to state 430 where the received data is compared with the expected data, regenerated from data stored in the 'Compare' RAM through the process discussed above. In general, the comparator 338 compares the received bits with the regenerated data and, at state 432, performs various analyses and other processes which may include, among other things, collecting various statistics such as single bit errors, bytes with errors, words with errors, and bits received since last error.

Such analysis by the comparator 338 exemplarily occurs bit-to-bit, thus enabling the comparator 338 to count the number of errors within the received test bit sequence. At state 434, the BER for the network path, or device(s), under test is then determined based upon the number of errors counted within the bit sequence. Specifically, the number of errors is integrated over a period of time in order to identify an average BER for the particular network path on which the bit sequence traveled. In some implementations, the comparison is momentarily disabled, or otherwise implemented periodically, in order to improve the accuracy of the error count. For example, if a received bit sequence is not synchronized, the comparator 338 may be deactivated in order to prevent erroneous bit error rate calculations.

Information obtained by, and/or generated by, the comparator 338 may be employed in a variety of useful ways. Once the characteristics of the errors identified by the comparator 338 are analyzed, various actions can be taken with respect to devices on the path. For example, in order to improve performance, repairs and/or adjustments may be made to network devices such optical amplifiers and repeaters.

As another example, some implementations of the comparator 338 are configured to transmit error counts to host software that interprets the error counts and then performs, or causes the performance of, one or more corresponding actions. Thus, a BER of $10^{-6}$ bit errors/second, for example, may define a threshold that, when reached, triggers generation and transmission of an appropriate notice to a network manager. As suggested by the foregoing, BER thresholds may represent major problems within the network such as a failing device, or cut or damaged optical transmission fiber. As another example, a relatively high BER may indicate a loss of synchronization.

The foregoing uses of information obtained by, and/or generated by, the comparator 338 are exemplary only and are not intended to limit the scope of the invention in any way. More generally, such information can be identified, collected, retained, analyzed and/or used in any other way that may prove useful in a particular application or operating environment. As suggested elsewhere herein, at least some implementations of the BERT are configured to perform error rate counts at the word level, as well as at the bit level. Among other things, such functionality enables the general use of the BERT in networks, regardless of buffering, so long as the data is not reordered. The following discussion considers various aspects of one such BERT implementation.

More particularly, such functionality is exemplarily implemented by way of a statistics and counter module configured with the appropriate types and numbers of error counters. In one exemplary implementation, the statistics and counter module is configured so that every group of 66 bits comprises a word, and each bit within a given word is checked for errors. When configured thus, the statistics and counter module will increment both bit and word error counters appropriately.

For example, a single bit error within a group of the 66 bits in a word implicates a word error as well as a bit error, so that both the word error counter and the bit error counter will increment by one if a single bit error is detected within a 66 bit word sequence. As another example, 66 bit errors within a word will cause the bit error counter to increment by 66 and the word error counter to increment by one, since 66 bit errors, within the same word, nonetheless correspond to only a single word error. In the case where no bit errors are detected within a 66 bit word, neither the bit error counter nor the word error counter will increment.

As suggested by the foregoing, both bit and word error rate calculations can be performed within a single BERT. Alternatively, other BERT implementations may be configured to calculate either word error rate calculations or bit error rate calculations. Thus, the scope of the invention should not be construed to be limited to any particular implementation of the BERT.

VII. Specific Operational/Control Aspects of an Exemplary BERT

As disclosed elsewhere herein, exemplary BERT command and control operations are implemented and/or facilitated by way of a control logic module operating in connection with a control bus and associated control and feedback paths. Details will now be provided regarding more specific aspects of data flow and related processing and control components and operations in an exemplary embodiment of a BERT, generally designated at 500, that is suitable for use in connection with networks and devices operating at line rates as high as about 10 Gigabits/second or higher. Note that, as details concerning some aspects of the structure and operation of an exemplary control logic module, and other BERT components, have been provided elsewhere herein, the following discussion will focus primarily on selected structural and operational aspects of the illustrated embodiment of the BERT.

With particular attention now to FIG. 4, the exemplary illustrated embodiment of the control logic module 502 comprises: a RAM address generator; a RAM parser; datapath control logic; synchronization and 'start' word detectors; bit error counter control logic; bit sequence capture control logic; and a host interface. Of course, various additional or alternative components may likewise be employed, consistent with the requirements of a particular application or operating environment.

Among other things, the control logic module 502 of the BERT 500 communicates with, and controls, various BERT 500 components by way of appropriate control buses. In the illustrated embodiment, a 'transmit' datapath control bus 504A is provided that generally enables the control logic module 502 to control and/or monitor the operation of the placeholder/PRBS generator 506, CRC checksum module 508, 64/66 block encoder 510, scrambler 512, and 66/64 gearbox/error injector 514 in the 'transmit' datapath. Similarly, a 'compare' datapath control bus 504B is also provided within the BERT 500. Among other things, the 'compare' datapath control bus 504B generally enables the control logic module 502 to control and/or monitor the operation of the placeholder/PRBS generator 516, CRC checksum module 518, 64/66 block encoder 520, scrambler 522, and comparator 524 in the 'compare' datapath.

In addition to the 'transmit' and 'compare' datapath control buses implemented and employed within the BERT 500, various other feedback and control structures and functionalities are likewise employed by embodiments of the BERT 500. For example, control signal paths 526 are provided that enable the control logic module 502 to control and direct the operation of the 'Send' RAM 528 and the 'Compare' RAM 530.

With continuing reference to FIG. 4, it was noted earlier herein that two synchronization bits, for 64:66 coding, are employed in connection with embodiments of the invention in order to facilitate bit alignment. Typically, such synchronization or 'sync' bits do not pass through the scrambler and descrambler modules of the BERT 500. This arrangement is reflected in FIG. 4, which illustrates various sync bit paths. One such path 532 is indicated that bypasses the scrambler 512 in the 'transmit' datapath. Another of such sync bit paths 534 is indicated that bypasses the scrambler 522 in the 'compare' datapath. A further sync bit path 536 is indicated that bypasses the descrambler 540 of the 'receive' datapath.

Various other data and control paths are provided as well. For example, the bit aligner 544 transmits an alignment signal to the control logic module 502 along the 'aligned' signal path 546, and also transmits a 'shift count' signal along a shift count signal path 548 to the 64/66 gearbox/bit shifter 538. Further, the 64/66 block decoder 542 of the 'receive' datapath communicates error signals to the control logic module 502 by way of an 'error' signal path 550.

In connection with the foregoing, and as indicated in the discussion of FIG. 3A, exemplary implementations of the BERT 500 define various paths that serve as both data and control signal buses. Examples of such buses include the bus 554A between the 'Send' RAM 528 and placeholder/PRBS generator 506, and the bus 554B between the 'Compare' RAM 530 and placeholder/PRBS generator 516. As used in FIG. 3A, the 'Data/Ctrl' busses refer to the control bits used with XGMII data. Each 8 bits of XGMII data has 1 associated control bit, which indicates whether that byte is a 'data' byte or a 'control' byte. For example, 'FB' with a control bit of 1 means an XGMII START character, whereas FB with a control bit of 0 means simply the data byte 'FB'.

Thus, exemplary implementations of the BERT 500 are configured to enable a variety of feedback and control functionalities with respect to BERT operations. Accordingly, the embodiment of BERT 500 illustrated in FIG. 4 is exemplary only and, more generally, the BERT may be configured to include various additional or alternative feedback and control functionalities. Consequently, the embodiment of the BERT illustrated in FIG. 4 should not be construed to limit the scope of the invention in any way.

In addition to providing for various internal control and feedback functionalities, implementations of the BERT 500 are also adapted to interact with various external devices and control and feedback signals and commands. For example, the BERT 500 is configured to interact with a clock/trigger logic module 600 that, in turn, receives a 'Refclk In' signal and transmits a 'Refclk Out' signal, as well as sending and receiving suitable 'Trigger I/O' signals. As described earlier, implementations of the BERT are also configured such that various BERT operations can be controlled as well by way of a host device running BERT control software.

With the foregoing discussion of specific aspects of a control logic module, and corresponding feedback and control signal buses in view, more particular reference is directed now to specific operational aspects of the BERT 500. Initially, the BERT 500 is activated when a user provides an input such as pressing a button, or typing a command on a command line interface displayed by a GUI, such as at a host device. The RAM address generator of the control logic module 502 generates a correct pattern address and transmits the correct pattern address to the 'SEND' RAM. The 'Send' RAM then provides the pattern per clock to the RAM parser of the control logic module 502.

Based on the results generated by the RAM parser, various options are then made available with regard to the structure and content of the test bit sequence. Such options may be exercised automatically by the BERT 500 and/or associated software at a host device, or may be exercised in the discretion of a user, and include, but are not limited to, injecting idles or fill words, and defining and filling place holders. As disclosed elsewhere herein, other devices on the network path may modify these idles or fill words by dropping some of them or adding more, in order to maintain synchronization of the data stream. Examples of various other options are disclosed elsewhere herein.

The RAM parser of the control logic module also gives the RAM address generator a command to generate the correct address based on control bits stored within the appropriate RAM. Whether, for example, a placeholder generator or PRBS generator is used depends on the actual system implemented in the bit error rate system. Thus, if the bit sequence is pseudo-random, then a PRBS generator will be used.

As noted earlier in connection with the discussion of FIG. 3A, a CRC checksum module 508 then regenerates and adds a checksum to the bit sequence generated by the bit sequence generator 506. The bit sequence is then passed to the 64/66 block encoder 510 and each block of 8 bits in the bit sequence is encoded into a 66-bit frame. The scrambler 512 then acts on the data portion of the frame to create transitions and DC balance. The 66-bit frames are then converted back to 64 bits by the 66:64 gearbox/error injector 514 and transmitted onto the network by way of the a media interface 700, which exemplarily comprises a 16/64 multiplexer/demultiplexer 700A and 300 pin XBI 700B.

The transmitted test bit sequence travels along the network path and returns through a 'receive' port of the BERT 500, by way of the 300 pin XBI 700B and 16/64 multiplexer/demultiplexer 700A. The bit sequence is then aligned, as described earlier, decoded by the 64/66 block decoder 542, and then passed to the control logic module 502. In particular, the decoded bit sequence received through the 'receive' datapath is then fed to the 'start' word detector within the control logic module 502, which detects and identifies the 'start' word of the bit sequence or word pattern. Because the design uses 64-bit internal datapaths, and because external network devices may add and drop fill words with 32-bit granularity, the start word detection logic is set up to detect both aligned and unaligned start words, that is, words shifted by 32 bits. When a 'start' word is detected, the corresponding raw bits are used to seed the 'compare' scrambler 522, as discussed previously, thus synchronizing the compare datapath output with the received bitstream. By reseeding the 'compare' scrambler 522 in this way, the BERT 500 is able to operate in connection with retiming devices that add/drop idles to/from the bit sequence, while still being able to perform bit sequence comparisons at the bit level.

This, and other, synchronization operations implemented in connection with exemplary embodiments of the BERT 500 are enabled by the presence of various appropriate delay elements that, in general, are effective in synchronizing various control and data buses within the BERT 500, examples of which are described elsewhere herein.

With continuing reference to FIG. 4, the comparator 524 then compares the received bit sequence to the synchronized bit sequence regenerated from the 'Compare' RAM 530. Base upon this comparison, the statistics/counter module 552 calculates a bit error rate. Bit errors are accumulated to measure the bit error rate on a particular network path. This calculation may be a simple calculation or an average bit error rate. Also, the statistics/counter module 552 provides other data to the user through the host GUI as described above.

In the above-described example, the test bit sequence was generated and transmitted from a first bi-directional port of the BERT 500 and received on a second bi-directional port of the BERT 500. Thus, the test bit sequence generation and memory channel on the receive port are different than the one actually used to generate the bit sequence. But if host software programs the RAMs for both channels with the same configuration, the receiver port will generate the same expected bit sequence, for comparison, as the bit sequence that was sent. As discussed below, exemplary implementations of the BERT 500 may also include various features that enable other types of measurements or error detection characteristics listed below.

In particular, exemplary implementations of the BERT 500 are configured to provide 64/66b coding/decoding datapaths, standard jitter patterns, arbitrary pattern entry and, for network devices that transmit and receive data on multiple parallel serial channels, or 'lanes,' the BERT 500 may be configured to provide different patterns per lane, adjustable lane-to-lane delay, as well as the ability to test each lane individually.

With particular reference to jitter patterns, exemplary implementations of the BERT 500 are configured to introduce a known amount of jitter to a network test bit data stream, and thereby enables an assessment as to the ability of a tested system to perform in connection with a jittered signal.

Also, exemplary implementations of the BERT 500 provide an adjustable traffic rate and frame size feature, as well as the ability to measure network latency by transmitting and receiving packets that include timestamps within the payload. Further details concerning exemplary aspects of the latency measuring aspect are provided below. Finally, the BERT 500 includes, in some implementations, an adjustable power source for both XBI and XENPAK modules at all levels, management data input/output ("MDIO") support for the XENPAK module, and also provides for low delay SMA-based in/out triggering, such as pattern clock or trigger on error.

Further, exemplary implementations of the he BERT 500 are configured to enable eye-pattern modification. In general, eye-pattern modification refers to the implementation of changes to the amplitude and duty cycle of the network test bit stream. Among other things, this functionality permits a user to assess the robustness and sensitivity of receivers and similar devices.

VIII. Exemplary Aspects of BERT-Implemented Latency Measurements

As suggested above, at least some implementations of the BERT are configured to measure the latency associated with a particular network or device, or group of devices. Because of the value assigned by customers and the industry to accurate and reliable high speed data transmission, such latency measurements are particularly useful in the design, testing, installation and maintenance of high speed networks.

While other systems exist to measure latency, such systems are typically implemented by software. In contrast, the latency functionality contemplated herein is implemented at the hardware level within the BERT and thus provides a relatively higher level of precision and resolution than is typically obtained with software-based solutions. Moreover, many known software tools typically measure latency at a resolution expressed in milliseconds. Such low resolution levels are ill-suited for use in connection with high speed networks where latency measurements in units of microseconds or nanoseconds may be desired. In one exemplary implementation of the BERT, latency measurements as fine as 10 nanoseconds can be measured. Such resolution is difficult, if not impossible, for higher-level, software-based solutions to achieve.

Moreover, because exemplary implementations of the BERT are capable of calculating a BER as well as performing latency measurements, the ability of a user to identify and diagnose problems in the associated network and devices is enhanced. By way of example, it may be the case in some instances that if a corrupted data packet is identified at about the same time that a relatively high latency is observed, a user may be better able to draw conclusions about the source of the problem than if, for example, only a BER was calculated, or only a latency measurement was made.

Typically, the measurement of latency involves transmission, from the BERT, of frames or other data packets onto the network and measuring the amount of time required for such frames to return to the BERT. In at least some implementations, a register is provided in associate with the BERT that contains an offset value, which may be determined heuristically, that reflects the amount of time required for the frame to transit the BERT and other hardware not part of the system under test. After the BERT has determined the raw latency value, the offset value is then deducted from that raw latency value to determine the actual latency of the system under test.

As in the case of other aspects of exemplary implementations of the BERT disclosed herein, aspects of particular latency measurements, or latency measurements to be made in connection with a particular system can be specified and configured through a GUI and software operating in connection with the BERT. Aspects of exemplary latency configuration options are provided below.

In one exemplary implementation, the user can specify one or more of the following options: reference clock rate; external clock speed; protocol; and, testing characteristics such as payload size and the number of idles between frames. In this implementation, the user can choose between the 10 G Fibre Channel clock rate of 10.51875 Gbps and the 10 GE clock rate of 10.31250 Gbps. The external clock speed can be set between 155 MHz and 170 MHz (9.920 Gbps to 10.720 Gbps), while the protocol options include 10 GE protocol, or the 10 G Fibre Channel protocol. Finally, with respect to payload size and the number of idles between frames, the payload size option generally allows the use to control the number of XGMII characters in the payload of the frame sent, while the idles between frames option permits the user to control the number of idle characters between the transmitted frames. Both the payload and the idles are counted by 8 bytes in this exemplary implementation.

Of course, the foregoing aspects of this implementation of the BERT are exemplary only. More generally, aspects of the latency measurements implemented by way of the BERT may be configured as necessary to suit the requirements of a particular application or operating environment. Accordingly, the scope of the invention should not be construed to be limited to the exemplary implementations described herein.

With particular reference now to FIG. 4, more specific details are provided concerning operational aspects of a latency measurement implemented in connection with a BERT 500. In particular, the placeholder/PRBS generator block 506 exemplarily contains timestamp insertion logic. When commanded to do so by the control logic module 502, the placeholder/PRBS generator block 506 inserts a timestamp, a type of placeholder, into the 'transmit' datastream. Exemplarily, the timestamp comprises an incrementing counter generated by the timestamp counter/latency calculation module 554. Typically, the timestamp is inserted in the data payload of a 10 GE or 10 G FC frame. In one exemplary BERT implementation, the timestamp counter increments every 10 nanoseconds and runs constantly.

When the frame returns through the 'receive' datapath of the BERT 500, the control logic module 502 commands the timestamp counter/latency calculation module 554 to subtract the timestamp value contained in the frame from the current counter value. This operation yields the time difference between the current time 'now' and the time at which the frame was sent, that is, the latency. Generally, the accuracy of this measurement is equal to the timestamp counter increment period, or 10 nanoseconds in this implementation.

As indicated in FIG. 4, the timestamp is inserted before the CRC checksum 512 and 64/66 block encoder 510. This arrangement enables the BERT 500 to generate 'legal' traffic when testing protocol devices. Thus, the timestamp in the received frame must be decoded again before the latency can be calculated and, accordingly, the timestamp counter/latency calculation module 554 operates on the data output from the 64:66 block decoder 542.

As in the case of all of the modules in this BERT implementation, the modules in the 'receive' datapath can be bypassed to pass through the data at their respective inputs. Moreover, latency measurements can be implemented in the 64 and 66-bit raw modes as well, in which case both the descrambler module 540 and the 64:66 block decoder module 542 would be in a 'bypass' mode.

VIV. General Aspects of Software

As disclosed elsewhere herein, aspects of implementations of the invention may be implemented by way of a host device and associated software. With respect to the host device, a special purpose or general purpose computer may be provided that includes various computer hardware, as discussed in greater detail below. Embodiments within the scope of the present invention also include computer-readable media for carrying or having computer-executable instructions or electronic content structures stored thereon. Such computer-readable media can be any available media which can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or electronic content structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, or special purpose processing device to perform a certain function or group of functions.

The following discussion is intended to provide a brief, general description of an exemplary computing environment in which aspects of exemplary embodiments of the invention may be implemented. Although not required, aspects of the invention may be described in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of the program code means for executing steps of the methods disclosed herein. The particular sequence of such executable instructions or associated content structures represent examples of corresponding acts for implementing the functions described in such steps.

Of course, the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment for example, program modules may be located in both local and remote memory storage devices.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A bit error rate tester suitable for use in connection with a high speed network, the bit error rate tester comprising:
    a first bit sequence generator;
    a control logic module configured to communicate with the first bit sequence generator;
    first and second memories configured and arranged for communication with the control logic module;
    a transmit port configured and arranged for communication with the first bit sequence generator, the control logic module and the network;
    a receive port configured and arranged for communication with the network;
    a bit synchronizer configured and arranged for communication with the receive port;
    a comparator configured and arranged for communication with at least one of the first and second memories.

2. The bit error rate tester as recited in claim 1, wherein the first bit sequence generator comprises a random bit sequence generator.

3. The bit error rate tester as recited in claim 1, wherein the control logic module and first and second memories collectively comprise a second bit sequence generator.

4. The bit error rate tester as recited in claim 3, wherein the second bit sequence generator comprises a non-random bit sequence generator.

5. The bit error rate tester as recited in claim 1, wherein the bit error rate testing device is suited for use with line speeds of about 10 Gigabits per second or greater.

6. The bit error rate tester as recited in claim 1, wherein the bit error rate testing device is compatible with a plurality of network protocols.

7. The bit error rate tester as recited in claim 1, wherein the bit error rate testing device is compatible with at least the 10 GE, FC, and SONET protocols.

8. The bit error rate tester as recited in claim 1, wherein the bit error rate tester is configured to operate in at least one of the following transmission modes: raw 64-bit; raw 66-bit; XGMII; and, continuous PRBS.

9. The bit error rate tester as recited in claim 1, wherein each of the receive port and the transmit port is selected from the group consisting of: an XBI interface; a direct serial interface; and, a XENPAK interface.

10. The bit error rate tester as recited in claim 1, wherein the first memory comprises a 'Send' RAM and the second memory comprises a 'Compare' RAM.

11. The bit error rate tester as recited in claim 1, further comprising:
    an encoder;
    a scrambler; and
    a gearbox, the encoder, scrambler and gearbox being configured and arranged for communication with the 'transmit' port.

12. The bit error rate tester as recited in claim 1, further comprising:
    a random bit sequence regenerator;
    an encoder; and
    a scrambler, the random bit sequence regenerator, the encoder and scrambler being configured and arranged for communication with the comparator.

13. The bit error rate tester as recited in claim 1, farther comprising a snoop buffer configured for at least indirect communication with at least one of: the network; and, the comparator.

14. The bit error rate tester as recited in claim 1, farther comprising a host interface.

15. A bit error rate tester suitable for use in connection with a high speed network, the bit error rate tester comprising:
    a plurality of components configured for operation in connection with at least the 10 Gigabit Ethernet, Fibre Channel, and SONET protocols, the plurality of components including:
        a first bit sequence generator;
        a second bit sequence generator, comprising:
            a control logic module configured to communicate with the first bit sequence generator; and
            first, and second memories configured and arranged for communication with the control logic module;
        a transmit port configured and arranged for communication with the first and second bit sequence generators;
        a receive port configured and arranged for communication with the network;
        a bit synchronizer configured and arranged for communication with the receive port;
        a comparator configured and arranged for communication with the second bit sequence generator; and
    a system bus that interconnects at least two of the plurality of components.

16. The bit error rate tester as recited in claim 15, wherein the first bit sequence generator comprises a placeholder/PRBS generator.

17. The bit error rate tester as recited in claim 15, wherein the second bit sequence generator comprises a non-random bit sequence generator.

18. The bit error rate tester as recited in claim 15, wherein the first memory comprises a 'Send' RAM and the and second memory comprises a 'Receive' RAM.

19. The bit error rate tester as recited in claim 15, wherein the first and second bit sequence generators are configured to operate in one or more of the following transmission modes: raw 64-bit; raw 66-bit; XGMII; and, continuous PRBS.

20. The bit error rate tester as recited in claim 15, wherein each of the transmit and receive ports is selected from the group consisting of: an XBI interface; a direct serial interface; and, an XAUI interface.

21. The bit error rate tester as recited in claim 15, wherein the bit synchrornzer comprises:
   a gearbox/bit shifter; and
   a bit aligner.

22. The bit error rate tester as recited in claim 15, further comprising a statistics/counters module configured and arranged to receive output from the comparator.

23. The bit error rate tester as recited in claim 15, further comprising:
   a CRC checksum module;
   an encoder;
   a scrambler; and
   a gearbox, the CRC checksum module, encoder, scrambler and gearbox cooperating with the first bit sequence generator to substantially define a 'transmit' datapath of the bit error rate tester.

24. The bit error rate tester as recited in claim 15, further comprising:
   a random bit sequence regenerator;
   a CRC checksum module
   an encoder; and
   a scrambler, the random bit sequence regenerator, CRC checksum module, encoder and scrambler cooperating with the comparator to substantially define a 'compare' datapath of the bit error rate tester.

25. The bit error rate tester as recited in claim 15, further comprising:
   a descrambler; and
   a decoder, the descrambler and decoder cooperating with the bit synchronizer to substantially define a 'receive' datapath of the bit error rate tester.

26. The bit error rate tester as recited in claim 15, further comprising a snoop buffer configured for at least indirect communication with at least one of: the network; and, the comparator.

27. The bit error rate tester as recited in claim 15, further comprising a host interface.

28. A method for bit error rate testing in a high speed network that includes at least one protocol-specific device which may be a retiming device or non-retiming device, the method comprising:
   generating a bit sequence;
   transmitting the bit sequence onto the network, the bit sequence being transmitted at a rate of 10 Gigabits per second or higher;
   receiving the bit sequence from the network;
   synchronizing, if necessary, the received bit sequence;
   regenerating the transmitted bit sequence;
   comparing the received bit sequence with the regenerated bit sequence;
   identifying errors, if any, within the received bit sequence based upon the comparison of the received bit sequence with the regenerated bit sequence; and
   calculating a bit error rate based upon the identified errors.

29. The method as recited in claim 28, wherein both the comparison of the received bit sequence with the regenerated bit sequence, and the identification of errors, proceed at the bit level.

30. The method as recited in claim 28, wherein at least a portion of the generated bit sequence is user-defined.

31. The method as recited in claim 28, wherein the bit sequence is generated pseudo-randomly.

32. The method as recited in claim 28, wherein the bit sequence is generated incrementally.

33. The method as recited in claim 28, wherein the bit sequence comprises arbitrary network traffic that does not necessarily conform to the network protocol.

34. The method as recited in claim 28, wherein the bit sequence conforms to the network protocol.

35. The method as recited in claim 28, wherein the generated bit sequence comprises:
   data bits;
   at least one idle;
   a start word;
   an end word; and
   a checksum.

36. The method as recited in claim 28, wherein synchronizing the received bit sequence comprises bit-aligning the received bit sequence.

37. The method as recited in claim 28, wherein comparing the received bit sequence with the regenerated bit sequence comprises comparing only selected portions of the received bit sequence with selected portions of the regenerated bit sequence.

38. The method as recited in claim 28, further comprising selecting a transmission mode from the group consisting of: raw 64-bit; raw 66-bit; XGMII; and, continuous PRBS.

39. The method as recited in claim 28, further comprising performing a DC balancing of the bit sequence prior to transmission.

40. The method as recited in claim 28, further comprising detecting start and end words of the received bit sequence.

41. The method as recited in claim 40, wherein comparing the received bit sequence with the regenerated bit sequence comprises comparing only data bits between the start and end words of the received bit sequence with the data bits between the start and end words of the regenerated bit sequence.

42. The method as recited in claim 28, further comprising preventing comparison of the received bit sequence with the regenerated bit sequence when an unsynchronized bit sequence is detected.

43. The method as recited in claim 28, further comprising buffering at least a portion of the received bit sequence.

44. The method as recited in claim 43, wherein the buffering of at least a portion of the received bit sequence takes place in response to the occurrence of a triggering event.

45. The method as recited in claim 28, further comprising encoding and scrambling at least one of: the generated bit sequence; and, the regenerated bit sequence.

46. The method as recited in claim 28, further comprising calculating a word error rate based upon the identified errors.

47. The method as recited in claim 28, further comprising descrambling and decoding the received bit sequence.

48. The method as recited in claim 28, further comprising measuring latency of at least a portion of the high speed network.

49. A method for bit error rate testing in a high speed network that includes at least one protocol-specific device which may be a retiming device or non-retiming device, the method comprising:
generating a bit sequence, wherein at least a portion of the generated bit sequence is user-defined;
transmitting the bit sequence onto the network;
receiving the bit sequence from the network;
synchronizing, if necessary, the received bit sequence;
regenerating the transmitted bit sequence;
comparing the received bit sequence with the regenerated bit sequence;
identifying errors, if any, within the received bit sequence based upon the comparison of the received bit sequence with the regenerated bit sequence; and
calculating a bit error rate based upon the identified errors.

50. The method as recited in claim 49, wherein both the comparison of the received bit sequence with the regenerated bit sequence, and the identification of errors, proceed at the bit level.

51. The method as recited in claim 49, wherein the bit sequence is generated pseudo-randomly.

52. The method as recited in claim 49, wherein the bit sequence is generated incrementally.

53. The method as recited in claim 49, wherein the bit sequence comprises arbitrary network traffic that does not necessarily conform to the network protocol.

54. The method as recited in claim 49, wherein the bit sequence conforms to the network protocol.

55. The method as recited in claim 49, wherein the generated bit sequence comprises:
data bits;
at least one idle;
a start word;
an end word; and
a checksum.

56. The method as recited in claim 49, wherein synchronizing the received bit sequence comprises bit-aligning the received bit sequence.

57. The method as recited in claim 49, wherein comparing the received bit sequence with the regenerated bit sequence comprises comparing only selected portions of the received bit sequence with selected portions of the regenerated bit sequence.

58. The method as recited in claim 49, further comprising selecting a transmission mode from the group consisting of: raw 64-bit; raw 66-bit; XGMII; and, continuous PRBS.

59. The method as recited in claim 49, further comprising performing a DC balancing of the bit sequence prior to transmission.

60. The method as recited in claim 49, further comprising detecting start and end words of the received bit sequence.

61. The method as recited in claim 60, wherein comparing the received bit sequence with the regenerated bit sequence comprises comparing only data bits between the start and end words of the received bit sequence with the data bits between the start and end words of the regenerated bit sequence.

62. The method as recited in claim 49, further comprising preventing comparison of the received bit sequence with the regenerated bit sequence when an unsynchronized bit sequence is detected.

63. The method as recited in claim 49, further comprising buffering at least a portion of the received bit sequence.

64. The method as recited in claim 63, wherein the buffering of at least a portion of the received bit sequence takes place in response to the occurrence of a triggering event.

65. The method as recited in claim 49, further comprising encoding and scrambling at least one of: the generated bit sequence; and, the regenerated bit sequence.

66. The method as recited in claim 49, further comprising calculating a word error rate based upon the identified errors.

67. The method as recited in claim 49, further comprising descrambling and decoding the received bit sequence and measuring latency of at least a portion of the high speed network.

* * * * *

UNITED STATES PATENT AND TRADEMARK OFFICE
CERTIFICATE OF CORRECTION

PATENT NO. : 7,231,558 B2  Page 1 of 2
APPLICATION NO. : 10/422456
DATED : June 12, 2007
INVENTOR(S) : Gentieu et al.

It is certified that error appears in the above-identified patent and that said Letters Patent is hereby corrected as shown below:

Abstract
Line 1, before "bit error", change "An" to --A--
Line 1, before "high", remove --a--

Drawings
Sheet 3, replace Figure 3B with the figure depicted below, wherein the reference of the step labeled "Calculate BER for Network Path or Device" has been changed from "432" to --434--

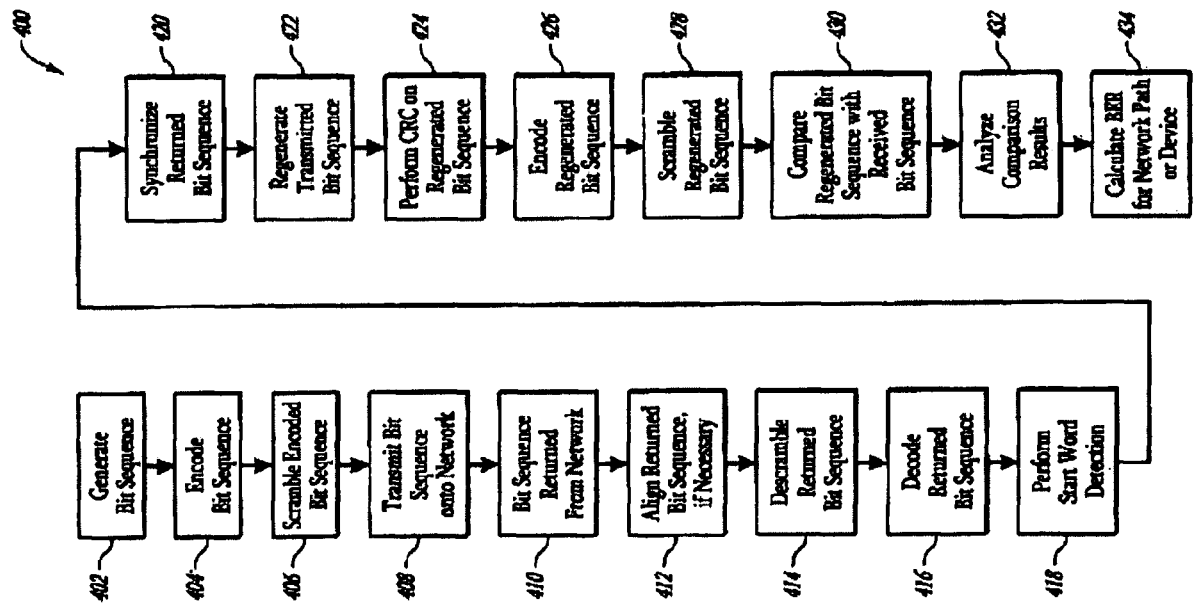

Signed and Sealed this

Thirteenth Day of July, 2010

David J. Kappos
*Director of the United States Patent and Trademark Office*

Column 4
Line 46, change "calculated" to --calculates--

Column 12
Line 41, after "BERT 100" change "," to --.--

Column 20
Line 11, change "305" to --308--
Line 20, change "305" to --308--
Line 58, change "306" to --308--

Column 22
Line 54, change "306" to --316--

Column 29
Line 61, change "Base" to --Based--

Column 34
Line 32, change "farther" to --further--
Line 49, after "first" remove --,--